United States Patent
Limpaecher et al.

[19]

[11] Patent Number: 6,118,678
[45] Date of Patent: Sep. 12, 2000

[54] CHARGE TRANSFER APPARATUS AND METHOD THEREFORE

[76] Inventors: Rudolf Limpaecher; Erik R. Limpaecher, both of 45 Parsonage La., Topsfield, Mass. 01983

[21] Appl. No.: 09/329,596

[22] Filed: Jun. 10, 1999

[51] Int. Cl.[7] .................................................. H02M 3/18
[52] U.S. Cl. ........................ 363/60; 320/166; 307/109
[58] Field of Search ............................ 320/166; 307/109, 307/108; 323/288; 363/59, 60, 61, 62

[56] References Cited

U.S. PATENT DOCUMENTS

| | | |
|---|---|---|
| 3,366,799 | 1/1968 | Fitch . |
| 3,663,940 | 5/1972 | Schwarz . |
| 3,743,914 | 7/1973 | Holtz . |
| 3,749,976 | 7/1973 | Colyn ................................... 315/241 R |
| 3,808,512 | 4/1974 | Sakka . |
| 3,839,666 | 10/1974 | Kitaev . |
| 3,849,670 | 11/1974 | Lourigan ................................. 307/108 |
| 3,849,717 | 11/1974 | Walz et al. . |
| 3,963,945 | 6/1976 | Colyn ....................................... 327/184 |
| 4,274,134 | 6/1981 | Johannessen . |
| 4,473,875 | 9/1984 | Parsons et al. ........................ 363/124 |
| 4,523,269 | 6/1985 | Baker et al. . |
| 4,613,765 | 9/1986 | Honig ........................................ 327/470 |
| 4,636,930 | 1/1987 | Bingham et al. . |
| 4,642,476 | 2/1987 | Honig . |
| 4,649,468 | 3/1987 | Cubbison, Jr. . |
| 4,675,795 | 6/1987 | Takamura et al. . |
| 4,797,899 | 1/1989 | Fuller . |
| 4,807,104 | 2/1989 | Floyd et al. . |
| 4,812,961 | 3/1989 | Essaff et al. . |
| 4,885,974 | 12/1989 | Honig ........................................ 307/106 |
| 5,270,913 | 12/1993 | Limpaecher . |
| 5,561,597 | 10/1996 | Limpaecher . |
| 5,764,501 | 6/1998 | Limpaecher . |

*Primary Examiner*—Shawn Riley
*Attorney, Agent, or Firm*—Pretty, Schroeder & Poplawski

[57] ABSTRACT

An apparatus and method therefore transfers electric charge between a charge storage device (25) and a first power terminal (11) having a plurality of first-nodes. The method interchanges charge between the charge storage device and a first first-node of the plurality of first-nodes through an inductive section (22); and, when a predetermined charge has been interchanged between the charge storage device and the first first-node, replacing the first first-node by a second first-node of the plurality of first-nodes. Charge is interchanged between the charge storage device and the second first-node through the inductive section. Preferably, the ratio of the charge interchanged between the charge storage device and the first first-node and the charge interchanged between the charge storage device and the second first-node is equal to a ratio of the currents drawn from the first first-node and the second first-node. Charge can also be interchanged between the charge storage device and a second power terminal (12) using a similar method.

52 Claims, 19 Drawing Sheets

CHARGE TRANSFER APPARATUS AND METHOD THEREFORE

CROSS-REFERENCES TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to the field of electric power conversion, and, more particularly, to a charge-transfer apparatus and method for alternating-current to alternating-current (AC-to-AC) power conversion, alternating-current to direct-current (AC-to-DC) rectification, DC-to-AC inversion, DC-DC power conversion, and volt-ampere-reactive (VAR) control. Although the invention is subject to a wide range of applications, it is especially suited for use in power distribution and transmission systems in electric utility, industrial, commercial, and marine applications.

2. Description of the Related Art

Standard AC-to-DC rectification apparatus using non-linear devices, for example, diode or thyristor bridges, causes harmonics and reactive power on a three-phase AC power supply providing electrical power to the apparatus. The harmonics and reactive power are caused by the uneven loading of the input phases. That is, current is drawn from the phase when the input AC phase voltage is greater than the output DC voltage, and no current is drawn from a phase when the input AC phase voltage is less than then the output DC voltage.

With the proliferation of variable-speed motor drives and back-up power sources, which typically require an AC-to-DC then DC-to-AC conversion to obtain the desired AC motor voltage and frequency, further distortion of the waveform of the AC power supply arises. As the waveform of the power supply, such as, the electric utility grid a generator on a marine vessel, deteriorates, malfunctions can occur to equipment that depend on a "clean" source of power for proper operation.

A need therefore exists for a power conversion apparatus, and a method therefore, that reduces distortion of the waveform of the AC power supply.

BRIEF SUMMARY OF THE INVENTION

The present invention, which tends to address this need, resides in a resonant charge-transfer apparatus (RCTA), and differential and sequential resonant charge-interchange (DSCI) method therefore. The RCTA and DSCI method described herein provides advantages over known power-conversion apparatus in that it reduces distortion of the waveform of the AC power supply, among other things.

The RCTA reduces this problem by drawing charge from all phases of a multi-phase power supply in proportion to the ratio of the current of the input phases. This yields harmonic-free power, draws power at unity power factor, and does not introduce reactive power into the AC power supply.

Furthermore, because the RCTA can be bi-directional, it can inject harmonic-free current at the fundamental frequency into the multi-phase AC power supply as well as synthesize a sinusoidal current waveform with a desired frequency and phase.

In general terms, the RCTA operates in two cycles. First, a desired charge is drawn from each phase of a power supply to charge an energy storage device. Second, the charge on the energy storage device is discharged through the output of the RCTA. Through many cycles of operation per second, the RCTA can extract charge from the power source and inject the charge through the output of the RCTA to construct a desired output waveform.

These transfers of charges may or may not provide a net energy transfer to or from the input terminal. With repeated charge interchanges, a net and controlled power flow can occur from an input terminal to an output terminal; or the repeated charge interchange can provide controlled reactive power of an AC power supply.

The power applied to the RCTA may be either multi-phase AC or DC. The produced output waveform can be either multi-phase AC having a desired voltage and frequency or DC having a desired voltage level and polarity. Conversion can be from AC to AC or DC, and DC to AC or DC.

For power flow control, the charge interchange occurs, in most applications, by a charge interchange between the power source and the charge storage device followed by a charge interchange between the charge storage device and the output. However, a direct power flow between the input terminal and the output terminal can be accomplished.

By controlling the charge interchange process, current can be drawn from, or injected into, a terminal; and, if averaged with a low-pass filter, yield practically ripple-free current flow.

An advantage of this invention is that it can utilize high-power thyristors that operate in a self or natural commutation mode. Thus, it does not require opening switches, such as, the pulse-width modulator (PWM) inverters using insulated-gate bipolar transistors or gate turn-off devices. Consequently, a circuit to control the opening of switches is not required.

The invention can use conventional thyristors, which have been in use for about 30 years. Unlike many conventional power electronic circuits, the power electric components utilized in the present invention are available and need not be developed. Also, these devices have the highest voltage rating, highest current rating, and one of the lowest forward voltage drops of any power electronic switch. These devices also have low losses, are inexpensive, and are available with both high-voltage and high-current ratings. Thus, the RCTA can be scaled up with present technology for high-power and high-voltage applications.

There are many applications for the RCTA and DSCI method. For example, the RCTA can be utilized in an AC-to-AC converter with power transfer occurring without the typical intermediate DC link. It can also be utilized as an AC-to-DC rectifier, DC-to-AC inverter, DC-to-DC converter, multi-port converter, harmonic compensator, VAR compensator, and electronic transformer,.

A feature of the RCTA is the harmonic-free conversion of multi-phase AC power to either multi-phase AC or DC. This is achieved by extracting charge from all of the phases in proportion to ratio of the current of the input phases by differentially charging the charge storage device from two input phases, followed by the replacement of one of the two phases by a third phase (referred to as "differential and sequential resonant charge-interchange (DSCI)").

Performing the charging at controlled intervals loads the multi-phase AC power supply to the desired power level at any part of the AC cycle. Loading the multi-phase AC power supply uniformly maintains a balanced and constant power. Through controlled charging, current can be drawn from the input that is in phase with the input voltage, thus the input power has a unity power factor. This eliminates the requirement for phase-angle corrections or VAR capacitors at the input of the RCTA. This technique is not restricted to a three-phase AC power system, but may be extended to any multi-phase system.

Through controlled discharging, the AC-to-AC converter can synthesize the output frequency and phase.

Further, the AC-to-AC converter can transfer energy from the AC power supply to an AC terminal that has its frequency and phase determined by another AC power source, such as, a generator. The injected charge can be in phase with the voltage of the another AC power source to transfer real AC power. Or, the injected charge can contain a fraction of charge that is out of phase with the voltage of the another AC power source, such that the power transfer contains reactive power. This mode of operation permits controlled power transfer from one AC power source to another AC power that have different phase, voltage, and frequency.

An application of the AC-to-AC converter is the controlled operation of power transfer between systems of different voltages. This permits controlled power flow to a system that may experience voltage, phase, and frequency instability. For example, the AC-to-AC converter may be used on the electric utility grid as a gateway controller to control the desired power flow. The gateway controller can control the power flow through an AC transmission line and limit the power flow within the thermal limit of the transmission lines. The gateway controller can also be used to transfer power from one regional AC power system to an adjoining AC power system. This could replace the utilization of DC link between the Easter, Western, the Texas, the Mexican, and the Canadian regional grids.

In another application, the gateway controller can control the power flow to damp the sub-harmonic instability of a regional AC grid.

Another application of the AC-to-AC converter is convert the frequency of the AC power supply to a different output frequency. This feature has many applications, one being for the use of variable speed motor drives. The AC-to-AC converter can dynamically control the voltage, frequency, phase, real power, and reactive power to the motor on a continuous basis over a specified range. Since the AC-to-AC converter can be controlled for bi-directional power flow, the motor can be also controlled for dynamic braking for full four-quadrant operation.

In another application, with a single-phase transformer inserted into either the charge or discharge cycle, the RCTA can be an electronic transformer with output voltage regulation, frequency change, and phase control capabilities. The input and output may be either DC or AC.

The single-phase transformer provides a greater input-to-output voltage ratio change over a large range than the previously described AC-to-AC power converter. The single-phase transformer can be used to step-up or step-down the input voltage. Further, the single-phase transformer can be used to obtain full galvanic isolation between the input and output. Because the single-phase transformer is located in the high frequency section of the electronic converter, the magnetic core size can be reduced.

Further, a typical AC transformer is energized all the time independent of the load factor, significantly reducing the efficiency at low and average loads. In the present invention, the efficiency is relatively constant because the core of the transformer is only energized when throughput power is required.

The transformer may be part of the charging circuit, inserted between the input switches and the charge storage device, or part of the discharge circuit, inserted between the charge storage device and the output switches.

Insertion of a single-phase transformer permits the RCTA to be utilized as a regulated electronic transformer. When an AC power supply for a facility needs to be stepped down in voltage, the electronic transformer not only performs the voltage transformation, output voltage regulation, and VAR neutralization, but also acts as the electronic circuit breaker, eliminating the need for mechanical switchgear.

Another application for the electronic transformer is as an interface between an AC power source and the AC grid. The power can be stepped-up from the generator voltage to the transmission voltage. Because the generator does not have to operate at the AC grid power frequency, a much greater flexibility is obtained. For example, the power source may be a turbine, a wind power generator, or an hydroelectric power plant. It is well known that a significantly higher fraction of the power can be captured for both the wind and hydroelectric power plant if the generator is not forced to operate at a constant frequency.

Still other implementations of the electronic transformer is an AC-to-DC step-down configuration for DC industrial processes, and an AC-to-DC step-up of the output of an AC generator to DC for direct DC transmission.

Using the DSCI technique for AC-to-DC power rectification, the power throughput can be fully regulated to yield a highly regulated output with minimum DC output-voltage ripple. The energy in the charge storage device is resonantly discharged into the DC output terminal.

In a preferred embodiment, a three-phase AC power supply is applied to the input terminal of the RCTA and a DC output that is positive, negative, or bi-polar is outputted. Unlike standard bridge rectification technique, no transformer isolation is required for a grounded system. In addition, several rectification modules may be operated in parallel with full individual power throughput control.

A feature of the AC-to-DC rectifier is that the output polarity can be operated over a large DC-voltage range with nearly instantaneous polarity reversal. Unlike the standard rectification process, where the output voltage is limited to a maximum value depending on the AC-input voltage, for this invention the output can be significantly boosted, only being limited by the selection of the active and passive components. The boost capability implies that, for many operations, standard voltages can be used eliminating transformers, and also a constant output can be maintained even with a significant droop of the AC power source. The droop can be either on the order of a cycle or over a prolonged period of time.

Several modes of voltage regulations are possible, for example, but not limited to, the following:
  a. Pulsed density modulation, by increasing or decreasing the number of charge and discharge cycles per a selected time interval.
  b. Residual voltage regulation of the charge storage device, typically controlled as part of the discharge cycle of the charge storage device.
  c. Control of the charging energy of the charge storage device during the charging cycle.
  d. Control of the discharge energy of the charge storage device during the discharging cycle.

An important feature of all regulation options is that the majority of the regulation does not require opening switches and falls under the category of "soft switching" operation.

The RCTA can also be utilized in a DC-to-AC inverter by reversing the AC-to-DC operation. The DC-to-AC inverter retains all the benefits that have been given above for the AC-to-DC converter.

The DC-to-AC inverter can synthesize an AC power source with a controlled voltage amplitude, constant or variable frequency, and selected phase angle. Or, energy can be transferred from the DC power source to an AC terminal that has its frequency and phase determined by an AC power source. The DC-to-AC inverter can simultaneously deliver not only the real power, with the injected current being in phase with the voltage, but also generate simultaneously reactive power with the current either leading or lagging the AC voltage wave form.

One application that takes advantage of the dual modes of AC-to-DC rectification and DC-to-AC inversion is energy storage in a battery. Energy can be extracted from the AC input during AC power availability on an electric grid, and the stored energy can returned to the AC grid when power is required.

Another application is for use with variable speed motors. The DC-to-AC operation can supply both the real and reactive power demand of the motor. The AC-to-DC operation would be applicable during the controlled dynamic breaking with the inverter delivering the real power to the DC power source.

The RCTA can be used to connect more than two power terminals to the charge storage device to form a multi-port inverter. All of these ports may be configured to have bi-directional power flow and the ports can be combinations of AC or DC, permitting transfer of electric charge or energy from any of the ports to any other port. Integrated into such a multi-port inverter can be a transformer. This would permit the connection of power terminals that are at different voltage levels. The multi-port inverter has a large number of practical applications. Two input AC power buses may be used to provide a redundant power source. Or a similar three-port configuration can be combined with a charge storage device to yield an uninterruptable power supply.

The RCTA can be utilized as a static volt-ampere-reactive (VAR) controller, harmonic compensator, voltage regulator, or flicker controller.

Other features and advantages of the present invention will be set forth in part in the description which follows and accompanying drawings, and in part become apparent to those skilled in the art upon examination of the following detailed description taken in conjunction with the accompanying drawings, or may be learned by practice of the present invention. The advantages of the present invention may be realized and attained by means of the instrumentalities and combinations particularly pointed out in the appended claims.

DESCRIPTION OF THE PREFERRED EMBODIMENTS

I. AC-to-AC Power Converter a. Circuit

Figure 1:
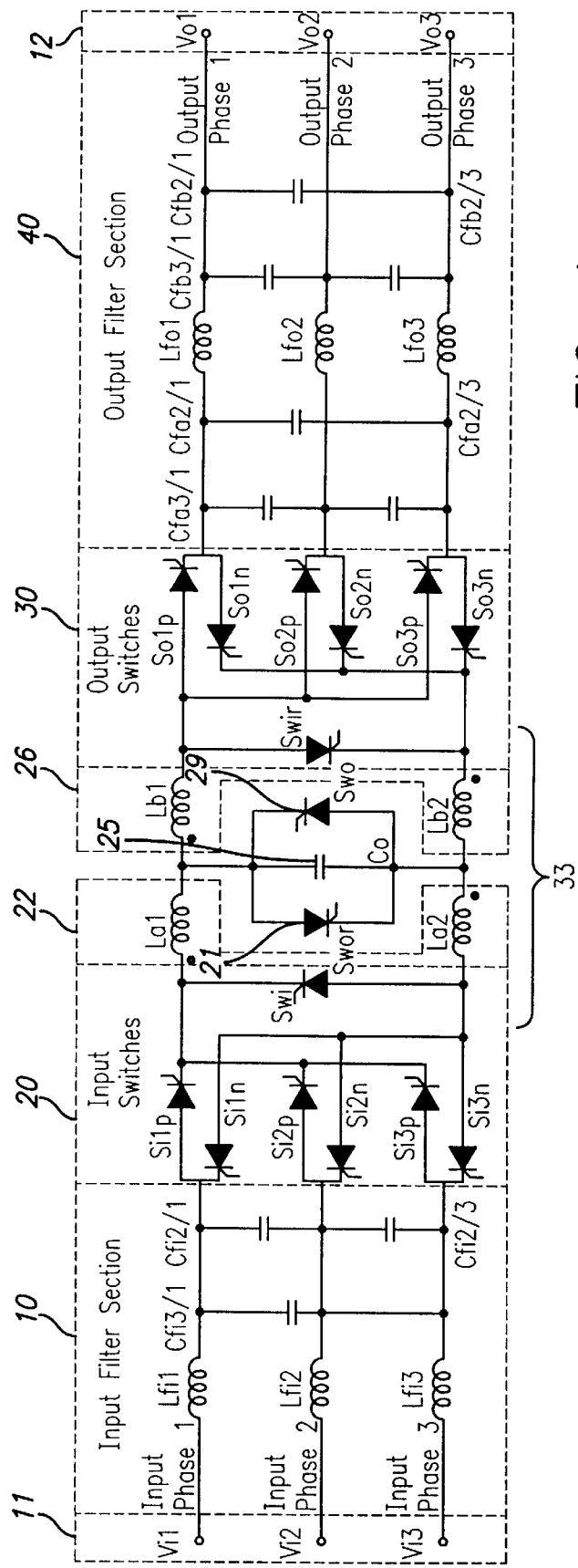
FIG. 1 is an electrical schematic of a power converter with frequency changer and bi-directional power flow capability.

FIG. 1 illustrates an electrical schematic of one embodiment of the RCTA employed as an AC-to-AC power converter 5 with frequency changer and bi-directional power flow capability. The AC-to-AC power converter exemplifies the basic structure and operation of the RCTA and RSDI method and will be described first. There are several embodiments of the RCTA and DSCI method, but the basic structure and operation of each is the same or similar.

The AC-to-AC converter can be directly connected to the AC grid without the use of a transformer. This will eliminate transformer losses and the cost, volume, and weight requirements of a transformer. Obviously, a transformer can be used if a specific apparatus is designed and constructed to require a different input voltage.

AC-to-AC converter 5 comprises a three-phase input terminal 11 for receiving a three-phase AC power supply, a three-phase low-pass input filter 10, an input switch section 20, an input inductive section 22, a charge storage device 25, an output inductive section 26, an output switch section 30, a three-phase low-pass output filter 40, and a three-phase output terminal 12 for supplying an output voltage.

Input filter 10 reduces the current ripple to a negligible value. Further, the filtering of high frequencies reduces both the filter capacitor and inductor values. Input filter 10 comprises inductors Lfi1, Lfi2, and Lfi3 and capacitors Cfi3/1, Cfi2/1, and Cfi2/3 in an "L-C" or "delta" configuration. A "Y" configuration could be used as well. With a switching frequency around 2000 Hz, a cut-off frequency of about 600 Hz is selected for the low-pass input filter.

Input switch section 20 controls the charging of charge storage device 25 from the phases of the three-phase power supply. Input switch section 20 comprises six input switches (Si1p, Si1n, Si2p, Si2n, Si3p, and Si3n), two switches of opposite polarity for each input phase. The input switches can be conventional thyristors.

Input inductive section 22 is one part of a resonant charge circuit formed with charge storage device 25. Input inductive section 22 includes two coupled inductors La1 and La2. La1 is coupled in series between the three positive input switches (Si1p, Si2p, and Si3p) and charge storage device 25; and La2 is coupled in series between the three negative input switches (Si1n, Si2n, and Si3n) and charge storage device 25. Only one charging inductor can be used, but, for symmetry, two are shown.

The charge storage device 25 stores the charge from the input phases and discharges the stored charge to output terminal 12. In this embodiment, charge storage device 25 includes a capacitor Co coupled in series with inductors La1 and La2.

Output inductive section 26 is one part of a resonant discharge circuit formed with charge storage device 25. Output inductive section 26 includes two coupled inductors Lb1 and Lb2. Only one discharging inductor can be used, but, for symmetry, two are shown.

Output switch section 30 controls the discharge of capacitor Co. Output switch section 20 comprises six output switches (So1p, So1n, So2p, So2n, So3p, and So3n), two switches of opposite polarity for each output phase. The output switches can be conventional thyristors.

Lb1 is coupled in series between charge storage device 25 and the three positive output switches (So1p, So2p, and So3p); and La2 is coupled in series between charge storage device 25 and the three negative output switches (So1n, So2n, and So3n).

Output filter 40 smoothes out any ripple, yielding a nearly harmonic-free, three-phase AC output. Output filter 40 comprises inductors Lfo1, Lfo2, and Lfo3 and capacitors Cfa3/1, Cfa2/1, Cfa2/3, Cfb3/1, Dfb2/1, and Cfb2/3 coupled in an "C-L-C" or "Pi" configuration. If a "Pi" input filter configuration had been chosen, the circuit would have perfect symmetry.

b. DSCI Operation

To demonstrate the principles behind the DSCI operation and self-commutation feature, the mathematical theory for unity input and output power factor operation is described in the following.

The input and output phase voltages can be defined as follows:

$$V_{i1} = V_o \sin(\omega_i t) \tag{1a}$$

$$V_{i2} = V_o \sin(\omega_i t - 2\pi/3) \tag{1b}$$

$$V_{i3} = V_o \sin(\omega_i t + 2\pi/3) \tag{1c}$$

$$V_{o1} = V_{ou} \sin(\omega_{ou} t) \tag{2a}$$

$$V_{o2} = V_{ou} \sin(\omega_{ou} t - 2\pi/3) \tag{2b}$$

$$V_{o3} = V_{ou} \sin(\omega_{ou} t + 2\pi/3) \tag{2c}$$

where $V_o$ is the peak input phase voltage; $\omega_i$ is frequency of the AC power supply; $V_{i1}$, $V_{i2}$, and $V_{i3}$ are the input phase voltages of input phases 1, 2, and, 3, respectively; $V_{ou}$ is the peak phase output voltage; $\omega_{ou}$ is frequency of the output voltage; and $V_{o1}$, $V_{o2}$, and $V_{o3}$ are the output phase voltages of output phases 1, 2, and, 3, respectively.

The instantaneous input phase voltages are ordered as, $|V_{ii}| \geq |V_{ij}| \geq |V_{ik}|$, and two of the three input phase-to-phase voltages are defined as, $V_a = |V_{ii} - V_{ij}|$ and $V_b = |V_{ii} - V_{ik}|$, where i, j, and k can be phase 1, 2, or 3.

To charge the capacitor Co and obtain self-commutation of the thyristors, at $t' = t'_0$, the thyristors corresponding to the highest and lowest absolute-value phase voltages, that is, the input phases "i" and "k", are triggered. Thus, the differential voltage $V_b$ is applied across the capacitor Co with the inductors La1 and La2 in series. $V_b$ is applied until the thyristor associated with the middle absolute-value phase voltage, that is, the input phase "j", is triggered at $t' = t'_1$.

The charging current and capacitor voltage for $t'_0 < t' < t'_1$ are (assuming $t'_0$ is zero for mathematical convenience), $$I_c(t') = I_o \sin(\omega_o t') \tag{3a}$$

$$V_c(t') = V_b(1 - \cos(\omega_o t')) \tag{3b}$$

where, $$\omega_o = 1/\sqrt{LC_o} \tag{4a}$$

$$Z = \sqrt{L/C_o} \tag{4b}$$

$$I_o = V_b/Z \tag{4c}$$

$$L = La1 + La2. \tag{4d}$$

At $t' = t'_1$, the thyristor of phase "j" is triggered to connect the differential voltage of $V_a$ across the capacitor 25. Further, applying $V_{ij}$ to the opposite end of the thyristor associated with the "k" phase causes the "k"-phase thyristor to self-commutate off.

At $t' = t'_2$, when the capacitor Co is fully charged to the differential voltage of $V_c(t'_2)$, the charging current becomes zero and the charging process is completed. The voltage and current between $t'_1 > t' > t'_2$ is given by equations (5) and (6).

$$I_c(t') = I_m \sin(\omega_o(t' - t'_1) + \Phi) \tag{5}$$

$$V_c(t') = V_c(t'_1) + I_m Z[\cos(\Phi) - \cos(\omega_o(t' - t'_1) + \Phi)] \tag{6}$$

where, $$I_m = [I_1^2 Z^2 + (V_a - V_1)^2]^{1/2}/Z \tag{7}$$

$$\Phi = \sin^{-1}[I_1 Z/(I_1^2 Z^2 + (V_a - V_1)^2)^{1/2}] \tag{8}$$

$$t'_2 = t'_1 + (\pi - \phi)/\omega \quad V_1 = V_c(t'_1) \quad I_1 = I_c(t'_1) \tag{9}$$

$$V_c(t'_2) = V_c(t'_1) + I_m Z(\cos(\Phi)+1). \tag{10}$$

The charges drawn from phases "k" and "j" are given by, $$Q_j = C[V_h^2 \sin^2(\omega_o t'_1) + (V_a - V_c(t'_1))^2]^{1/2} \tag{11a}$$

$$Q_k = CV_c(t'_1). \tag{11b}$$

To draw harmonic-free power from the input, the ratio of the charge drawn from each input phase must be equal to the ratio of the absolute value of the input phase currents. Because $Q_i = -(Q_j + Q_k)$, $t'_1$ is selected such that the ratio of the charge drawn from the two phases "j" and "k" is the same ratio as the absolute value of the input phase "j" and "k" currents. It follows that the correct charge is also drawn from the input phase "i".

For unity input power factor, the current ratio is identical to the input phase voltage ratio. It follows that, $$R(\omega_i t) = \frac{V_k(\omega_i t)}{V_j(\omega_i t)} = \frac{V_c(t'_1)}{[V_b^2 \sin^2(\omega_o t'_1) + (V_a - V_c(t'_1))^2]^{1/2}} \tag{12}$$

Solving equation (12), there is one unique value for the time of $t'_1$ for every input phase angle ($\omega_i t$). The values of $t'_1$ can be calculated and stored in a table and read out by a controller that triggers the thyristors at the appropriate time according to the input phase angle.

For unity output power factor, the discharge operation is the inverse of the charge operation described above. That is, the output thyristors corresponding to the two highest absolute-value output voltages are first triggered, and then the thyristor corresponding to the lowest absolute-value output voltage is triggered so that the ratio of the charge injected into the output phases is equal to the ration of the output phase currents.

c. Examples of the DCSI Operation

1. Unity Power Factor Operation

The above-described charge cycle operation will now be described with a particular example using the AC-to-AC power converter shown in FIG. 1. In this example, power is drawn at unity power factor, thus the input phase voltage ratios are equal to the input phase current ratios. For ready understanding, the input phase voltages, rather than the input phase currents, will be used to describe the switching.

An input phase angle of 80 electrical degrees is selected. For a 480 volt (V), 60 Hertz (Hz), three-phase AC input, the phase voltages are $V_{i1}=386$ V, $V_{i2}=-252$ V, and $V_{i3}=-134$ V. (See equations 1a–1c.)

Figure 2:
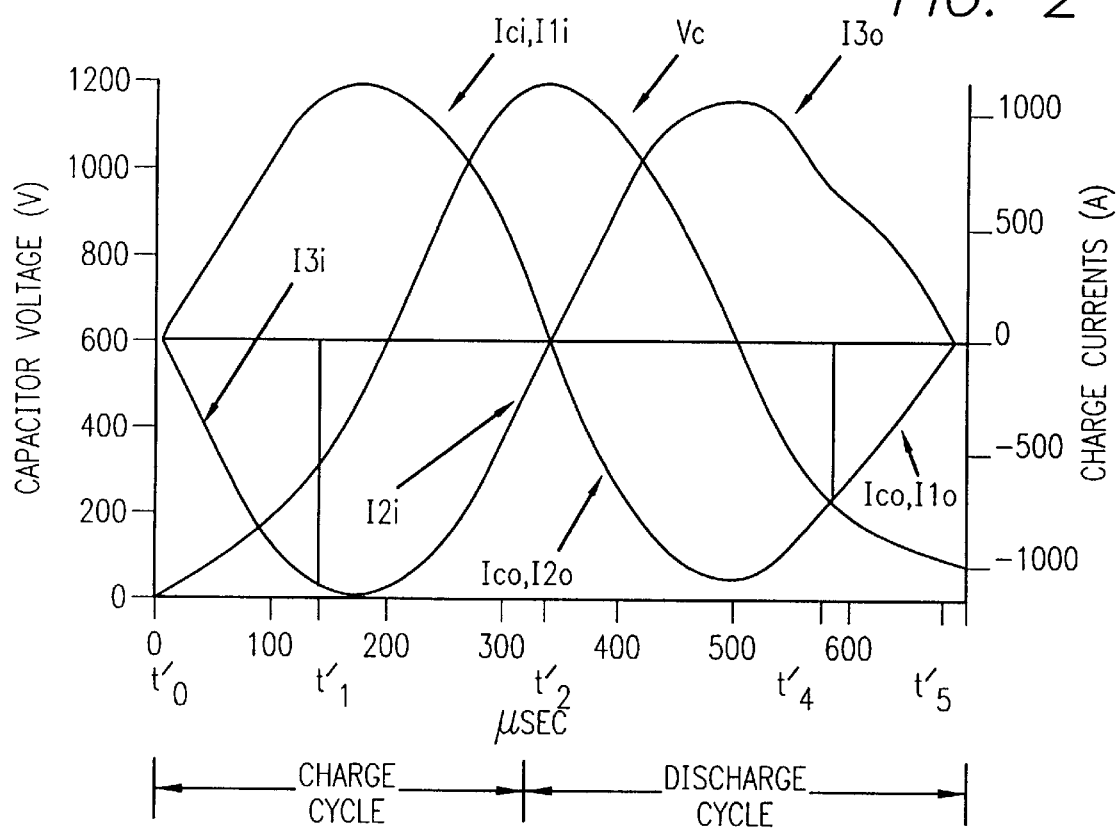
FIG. 2 is a graph of a typical charge interchange waveform of the power converter, shown in FIG. 1, operating at unity input and output power factor.

The charging process is started at $t'=t'_0$ by triggering Si1p (the thyristor corresponding to the highest absolute-value phase voltage) and Si3n (the thyristor corresponding to the lowest absolute-value phase voltage). Thus, the phase-to-phase voltage of $V_b=520$ V is applied across the input of inductors La1 and La2. The initial voltage on capacitor Co is 0 V (see equation 3b), and the charging current Ici through the capacitor starts out as a sine wave as shown in FIG. 2 (see equation 3a). The input phase 1 current I1i is the same as the charging current Ici, and the input phase 3 current I3i is the opposite of I1i for the first part of the charge cycle.

At $t'=t'_1$, the thyristor Si2n (the thyristor corresponding to the medium absolute phase voltage) is triggered. The input phase 2 voltage of −252 V back biases Si3n to self-commutate if off. This terminates the charging process from the input phase 3.

For the second part of the charge cycle, the differential input voltage is $V_a=638$ V. Because charging current Ici through the inductors and the voltage across the capacitor Vc cannot change instantaneously, Ici and Vc do not change when the thyristor Si2n is triggered. The charge transfer continues and concludes when the capacitor Co reaches maximum voltage and the charging current through the capacitor becomes zero. The conducting thyristors Si1p and Si2n self-commutate off at this point.

Using equation (12), and with Co=200 $\mu$F and La1+La2= 50 $\mu$H, the thyristor Si2n triggers at $t'_1=136$ $\mu$sec and turns off at $t'_2=334$ $\mu$sec. As shown in FIG. 2, the current drawn from the positive input phase 1 is the sum of the two negative input phases 3 and 2 and opposite in polarity. The triggering time $t'_1$ was selected such that the ratio of the charge drawn from phases 2 and 3 is directly proportional to the input phase voltages of phases 2 and 3. This also yields the result that the energy drawn from the input is proportional to the input voltage squared.

The discharge operation will now be described. In this example, output power is at unity power factor, thus the output phase voltage ratios are equal to the output phase current ratios. For ready understanding, the output phase voltages, rather than the output phase currents, will be used to describe the switching.

With the output frequency and voltage amplitude defined as $f_{ou}$ and $V_{ou}$, the output voltage requirements can be determined. For example, with an output phase angle of 170 electrical degrees, the three output phase voltage requirements are $V_{o1}=68$ V, $V_{o2}=300$ V, and $V_{o3}=-368$ V. (See equations 2a–2c.)

The discharge cycle begins after the charge cycle as shown in FIG. 2. The two highest absolute-value phase voltages are first discharged. Referring to FIG. 1, So2p and So3n are triggered at $t'_3=335$ $\mu$sec. Thus the full voltage of capacitor Co is connected across the output phases 2 and 3.

The discharge current Ico begins as a sine wave and is altered at $t'_4$ as the thyristor So1p is triggered to connect the positive end of the capacitor Co to lowest absolute-value phase voltage, that is, phase 1. Because the voltage on output phase 1 is less than the voltage on output phase 2, the thyristor So2p self-commutates off and the discharging continues on output phases 1 and 3. For the ratio of the charges injected into phases 2 and 1 to be directly proportional to the output phase voltages of output phases 2 and 1, $t'_4=579$ $\mu$sec in this example.

When the voltage on Co decays to zero at $t_5$, a freewheeling switch Swo 29 is turned on to prevent the inverse recharging of Co. The residual energy stored in the output inductors Lb1 and Lb2 is thus applied across the output phases 3 and 1. Furthermore, when the current through the output inductor becomes zero, the thyristors So1p, So3n, and Swo self-commutate and the next charge cycle commences.

2. Reactive Power Injection and Output Voltage Boost

In the above example, the output thyristor So1p triggering is selected to obtain a balanced, harmonic free, and unity output power factor with the required energy distribution. This is a special case and is not typical, because most loads draw reactive power and the power converter must supply it. Additionally, the output voltage requirement may be larger than the input voltage requirement, which requires the capacitor Co to be charged to a higher voltage.

Figure 3:
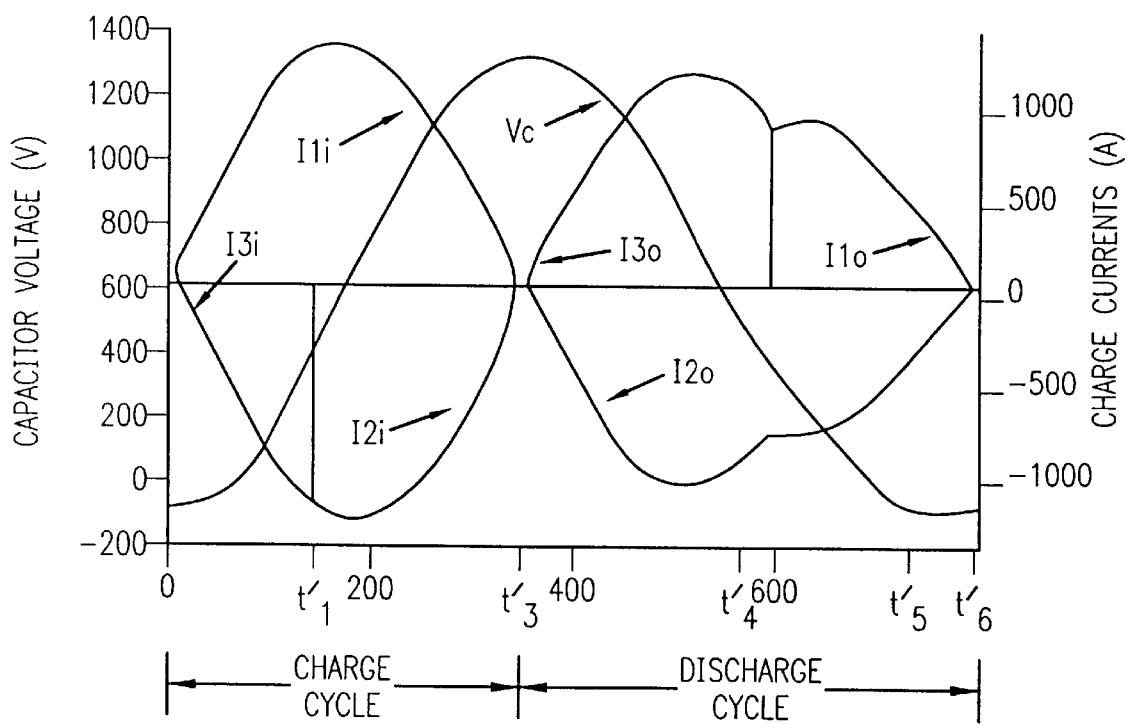
FIG. 3 is a graph of another typical charge interchange waveform of the converter, shown in FIG. 1, operating at unity input power factor and supplying reactive power and voltage boost.

The operation for supplying reactive power and boosting voltage is described in the next example with reference to FIG. 3. Because the output phase voltage ratios do not equal the output phase current ratios for the case of reactive power output, line currents will be used to describe the switching.

The charging process is similar to the previous example, because only real power components are drawn. However, an initial residual capacitor voltage provides the voltage boost. Because the residual capacitor voltage is −100 V and not zero, the triggering of the thyristor Si2n is shifted slightly from $t'_1=136$ μsec to $t'_1=134$ μsec.

With an output voltage governed by equation (2a) through (2c), and the output current leading the output voltage by 30 electrical degrees (π/6), the output phase current requirement is as follows:

$$I_{o1}=I_{om}\sin(\omega_{out}t+\pi/6)=-68.34A \quad (13a)$$

$$I_{o2}=I_{om}\sin(\omega_{out}t-2\pi/3+\pi/6)=196.96A \quad (13b)$$

$$I_{o2}=I_{om}\sin(\omega_{out}t-2\pi/3+\pi/6)=196.96A \quad (13c)$$

The phase currents are ordered as $|I_{o2}|>|I_{o3}|>|I_{o1}|$. Because output phase 2 has the highest absolute value current requirements and is positive, thyristor So2p remains on for the entire discharge, and So1n and So3n share the discharge period.

This is a different discharge switching sequence from the previous example because of the reactive power requirement. In the previous example, So3p remained on for the entire discharge, and So1n and So2n shared the discharge period.

Another difference is that the capacitor Co starts out with a voltage of −100 V. This controlled residual voltage, left over from the previous discharge, will boost the input energy, therefore increasing the power throughput.

Still another difference is that the maximum voltage on Co is increased to 1294 V from 1194 V, the difference defined by the negative starting value of the residual capacitor voltage. This results in an increase of the throughput energy by about 18%. Operating at a constant converter frequency, the power throughput is increased by the same factor.

In addition to supplying reactive power, the output voltage requirement is increased by 10% to a phase-to-phase output of 528 V rms. Thus, power can be transferred from a lower voltage grid to higher voltage grid, in this case from 480 V to 528 V.

Thyristor So2p is triggered at $t'_3=360$ μsec. Because thyristor So3n has the more negative voltage value, it is also triggered at $t'_3$. At $t'_4=578$ μsec So1n is triggered. This time is selected because it is the time that the ratio of the charge drawn from output phases 1 and 3 is equal to the ratio of the output currents on phases 1 and 3. Because the voltage on output phase 1 (68 V) is greater than the voltage on output phase 3 (−368 V), thyristor So3n self commutates off.

At $t'_5=704$ μsec, the capacitor Co is recharged to −100 V. Because this is the selected residual voltage for the next charge, a free-wheeling switch 29 Swo is triggered to clamp the capacitor voltage and prevent further recharging of the capacitor.

Further, when switch Swo is triggered, the residual energy in the discharge inductors Lb1 and Lb2 transfer to the output. The free-wheeling current becomes zero at $t'_6=760$ μsec and the thyristors Swo, So1n, and So2n self commutate off. This concludes the discharge cycle and permits the next charge cycle to start with the same initial condition as in the previous cycle, namely, with a residual voltage of −100 V.

Control of the residual voltage has many implications. Residual voltage could have been reduced or increased by triggering the free-wheeling switch Swo earlier or later. This implies that the energy throughput per cycle can either be decreased or increased.

Secondly, with the control of the residual voltage, energy can be transferred from a lower voltage power source to a higher voltage terminal. This boost mode operation can, in principle, permit a step-up of voltage to any level. In practice, the transformation ratio will be limited by the thyristor and capacitor voltage ratings. However, a power converter designed for a particular voltage can be operated with a drooping input power source and deliver rated output power without stressing the electrical components. The power converter can also operate with a positive residual voltage. This will reduce the energy throughput per cycle and operate the power converter at a frequency sufficient to limit the harmonic level during lower throughput power demand.

Thirdly, real and reactive output power requirements are fully controllable. For the same output voltage phase angle, the injected output current may be completely in phase with the output voltage, fully leading or lagging the output voltage by 90 electrical degrees, or be any angle in between. However, as the phase angle increases so must the minimum residual voltage. Finally, as the phase angle difference becomes a full 90 degrees, the residual voltage will be the same as the initial voltage but opposite in polarity since no net energy is being transferred.

With a second free-wheeling switch 21 Swor, the power converter can operate as a bi-directional power converter. When power flows from left to right, the capacitor Co is charged positively. Conversely, when power flows from right to left, the capacitor Co is charged negatively.

The switch Swi can be used in the charge operation with opening input switches with power flow from left to right, while switch Swir can be used with opening switches with power flow from right to left.

d. Generalized Operation

From the above examples, a generalized method of charge interchange and switching can be developed that provides self-commutation of the switches. The generalized method of the charging cycle for a given input phase angle is as follows:

1) Trigger the input thyristor (i) corresponding to the input phase current having the highest absolute value and (ii) of the same polarity as the input phase current having the highest absolute value.

2) Of the two remaining input phases, trigger the input thyristor (i) opposite in polarity to the input thyristor triggered in step 1 and (ii) (a) if the opposite polarity is positive, corresponding to the output phase having the less positive voltage value, or (b) if the opposite polarity is negative, corresponding to the output phase having the less negative voltage value.

3) Trigger the other input thyristor of the two remaining input phases (i) that is opposite in polarity to the input thyristor triggered in step 1 (ii) at a time such that the ratio of the charge drawn from the two remaining input phases is equal to the ratio of the input currents of the two remaining input phases.

The generalized method of the discharging cycle for a given output phase angle is as follows:

1) Trigger the output thyristor (i) corresponding to the output phase current having the highest absolute value and (ii) of the same polarity as the output phase current having the highest absolute value.

2) Of the two remaining output phases, trigger the output thyristor (i) opposite in polarity to the output thyristor triggered in step 1 and (ii) (a) if the opposite polarity is positive, corresponding to the output phase having the more positive voltage value, or (b) if the opposite polarity is negative, corresponding to the output phase having the more negative voltage value.

3) Trigger the other output thyristor of the two remaining output phases (i) that is opposite in polarity to the output thyristor triggered in step 1 (ii) at a time such that the ratio of the charge injected into the two remaining output phases is equal to the ratio of the output currents of the two remaining output phases.

4) Trigger the free-wheeling switch when the capacitor voltage reaches a predetermined residual voltage.

II. AC-to-DC Rectifier

The RCTA can be utilized as an AC-to-DC rectifier. The output in FIG. 1 can be controlled such that the voltage and currents for two of the output phases are equivalent to each other, but opposite in polarity.

For example, for an output phase angle of 60 electric degrees, the output phase voltages are $V_{o1}=+0.87\ V_{ou}$, $V_{o2}=0.0\ V$, and $V_{o3}=-0.87\ V_{ou}$. (See equations 2.) Continued operation at this output phase angle produces a DC output, because positive charge is injected into the first output phase, no charge is injected into the second output phase, and negative charge into the third output phase. Because no energy or charge is being injected into the second phase, it can be neglected and the output is in a two-terminal configuration. It follows that the voltage between output phase 1 and output phase 3 can be maintained at a constant voltage and therefore represents a DC power source.

Because there is no galvanic connections between the input and output, either the positive or negative terminal can be referenced to ground, such that we can have a positive and negative DC power source. Not grounding any of the two terminals will yield a completely floating DC power source.

The DC discharging process is a subset of the AC discharging process and comprises, for the above example, triggering the thyristors So1p and So3n at the start of the discharge cycle. As soon as the capacitor Co reaches its selected residual voltage, the free-wheeling switch Swo is triggered as for the AC output operation. This will stop the recharging of the capacitor Co and transfer of the residual energy stored in the output charging inductors Lb1 and Lb2 to the output phases 1 and 3. As the output current becomes zero, all three thyristors Sop1, Son3, and Swo become back biased and self-commutate off.

The remaining switches So1n, So2p, So2n, and So3p are not used and can be removed from the circuit of FIG. 1. For bi-directional operation, the two thyristors So1n and So3p are required.

The typical maximum DC output voltage is about 60% of the AC root-mean-square (RMS) input voltage without boost mode operation. With boost mode operation, the output voltage can be raised with residual voltage control. Furthermore, the output phase can be changed from one discharge cycle to the next by 180 electrical degrees, yielding a full DC polarity reversal.

This harmonic-free rectifier has a unity power factor. If power is drawn from an induction generator, the charge cycle can be controlled to draw reactive power, providing the required excitation current, or can improve the power factor for a power source.

III. DC-to-AC Inverter

Operating the AC-to-DC rectifier in the reverse direction will yield a DC-to-AC inverter with both boost mode capability and reactive power control on the AC side.

The DC charging process is a subset of the AC charging process operation. Assuming an AC input phase angle of 60 electrical degrees, the phase voltages are $V_{i1}=+0.87\ V_o$, $V_{i2}=0.0$, and $V_{i3}=-0.87\ V_o$. (See equations 1.) For a unity power factor, no charge is drawn from phase 2 and the input voltage $V_a$ is $1.73\ V_o$. The charging process is initiated by triggering the input thyristors $S_{i1p}$ and $S_{i3n}$ at t'=0. The charging process proceeds in accordance with equations 3a and 3b, replacing $V_b$ by the value $1.73\ V_o$. The charging process continues until the charging current becomes zero at $t'_2=\pi/\omega_o$. According to equation 3b, the maximum capacitor voltage becomes twice of the input voltage between the input phases 1 and 3.

The same charging condition can be obtained if the three-phase AC power supply is replaced with a DC power source of $V_{DC}$ having the identical input voltage of $1.73\ V_o$. The positive DC terminal is coupled to the input of Si1p and the negative terminal to Si3n. Because no other thyristors are used in the charging process, the remaining four input thyristors can be removed. However, for bi-directional operation the thyristors $S_{i1n}$ and $S_{i3p}$ are required.

IV. DC-to-DC Converter

The circuit of FIG. 1 can also be used as a DC-to-DC converter. The DC charging process is identical to the DC-to-AC rectifier charging process, and the DC discharging process is identical to the AC-to-DC rectifier discharging process.

Figure 4:
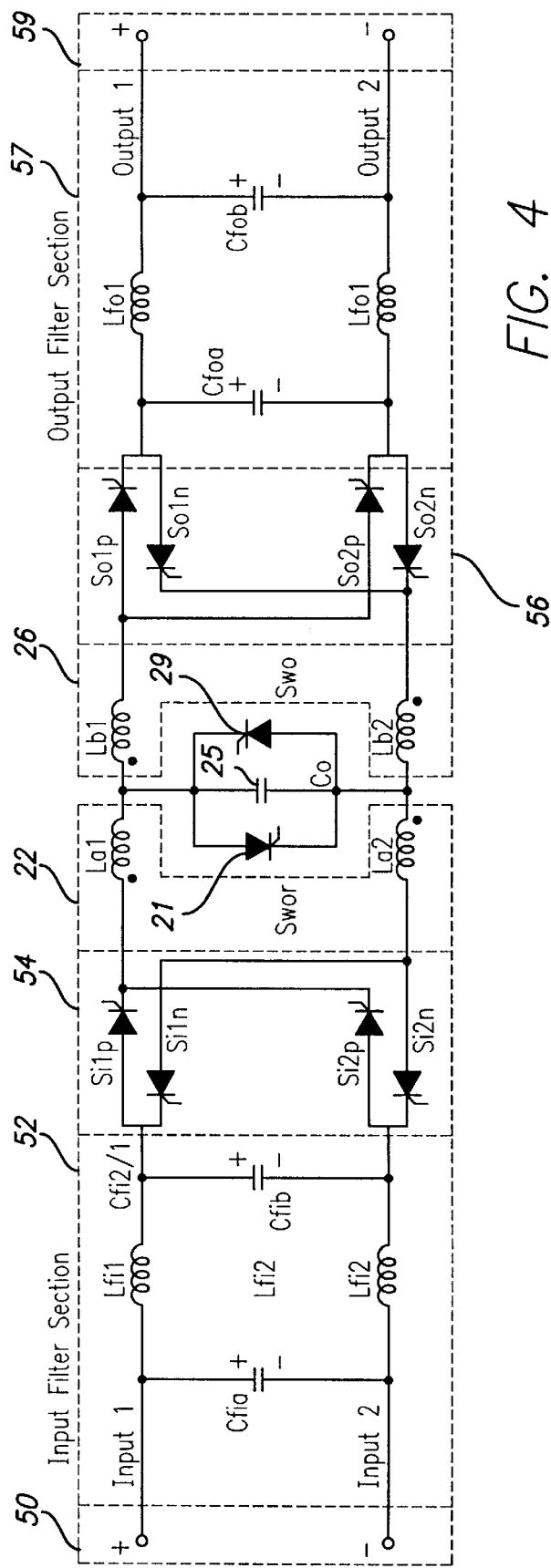
FIG. 4 is an electrical schematic of the basic architecture of a DC-to-DC converter with bi-directional power flow capability.

FIG. 4 illustrates the basic architecture of a DC-to-DC converter that has bi-directional capabilities. A DC power supply is applied to DC input terminal 50, which is coupled to an input switch section 54 via an input filter 52. The charging inductors La1 and La2, capacitor 25, output inductors Lb1 and Lb2, and free-wheeling switches 21 and 29 are not changed. An output switch section 56 and output filter 57 are identical to the input switch section 54 and the input filter 52.

The thyristors Si1n, Si2p, Swor, So1n, and So2p can be eliminated if only unidirectional power flow is required. Furthermore, if the negative terminals for the input and output can be referenced to the same potential, all additional components and the lower part of the circuit can be eliminated, thereby highly simplifying the circuit.

The forward voltage drops through two switches make up the major losses for the minimum regulated DC-to-DC capability. The operation requires no opening of the switches, and thyristors can be used with "soft switching" operation and self commutation.

The same control rules apply for this DC-to-DC converter as for the AC-to-AC converter control. Both the inverter frequency and residual voltage can control the power. Operating with a residual voltage, the power can be transferred from a lower voltage DC source to a higher DC output. Replacing either the input or output charging inductors with a single-phase transformer, as will be described in a later section, will permit a DC power transfer with a large voltage step-up or step-down. The voltage ratio is determined by the turns ratio of the transformer and the additional regulating capability of the inverter.

V. Multi-Port Converter

In the power converter of FIG. 1, one input section (input filter 10 and input switch 20) and one output section (output switch 30 and output filter 40) are coupled to the charge storage device 25. With the two free-wheeling switches 21 and 29, both sections can be used as either an input or an output. Their function may be switched from one cycle to the next.

Charge storage device 25, free-wheeling switches 21 and 29, input inductive section 22, and output inductive section 28 form a central section 33. The numbers of inductors may be reduced from four to one by placing a single inductor in series with the capacitor Co, yielding the same resonant charging and discharging period.

Figure 5:
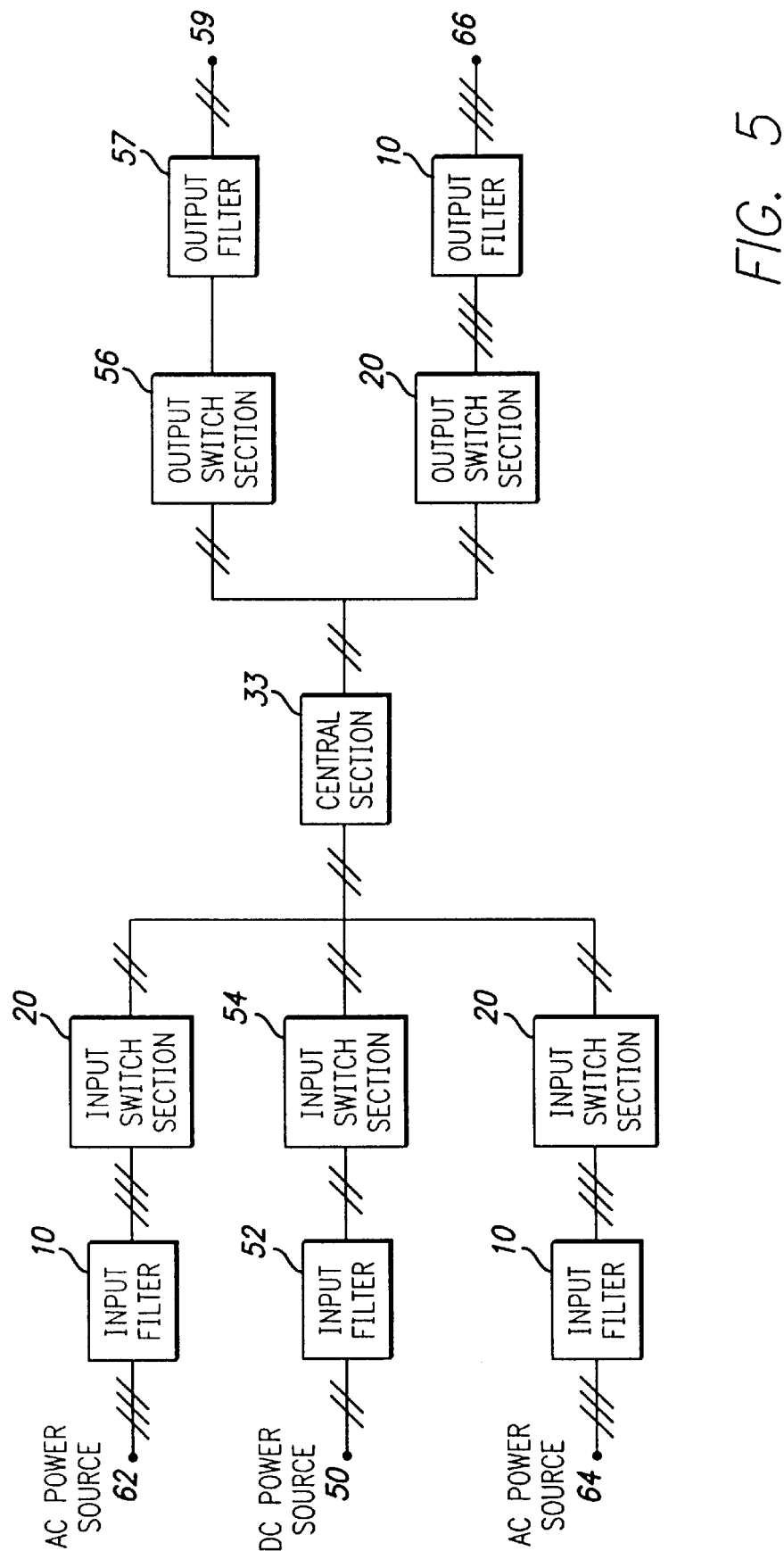
FIG. 5 is block diagram of a multi-port converter with AC and DC inputs and AC and DC outputs.

More than two connections to the central section 33 can be made to create additional inputs, outputs, or bi-directional sections. FIG. 5 illustrates a multi-port converter having three AC terminals 62, 64, and 66 connected to the central section 33 through three identical input/output switch section 20 and input/output filters 10. Additionally, two DC terminals 50 and 59, for connecting a DC power source and DC load, are can be coupled with central section 33 via input/output filters 52 and 57 and input/output switch sections 54 and 56.

This configuration permits the use of multiple power sources and loads. Power can be drawn from multiple power sources in a time interleaving manner, or power can be transferred from one power source to the next, slowly or from one charge cycle to the next. Because the multi-port converter can be operated with both DC and AC power sources and loads, the multi-port converter provides maximum operational flexibility.

VI. Power Converter With Simultaneous Input and Output Charge Exchange

Figure 6:
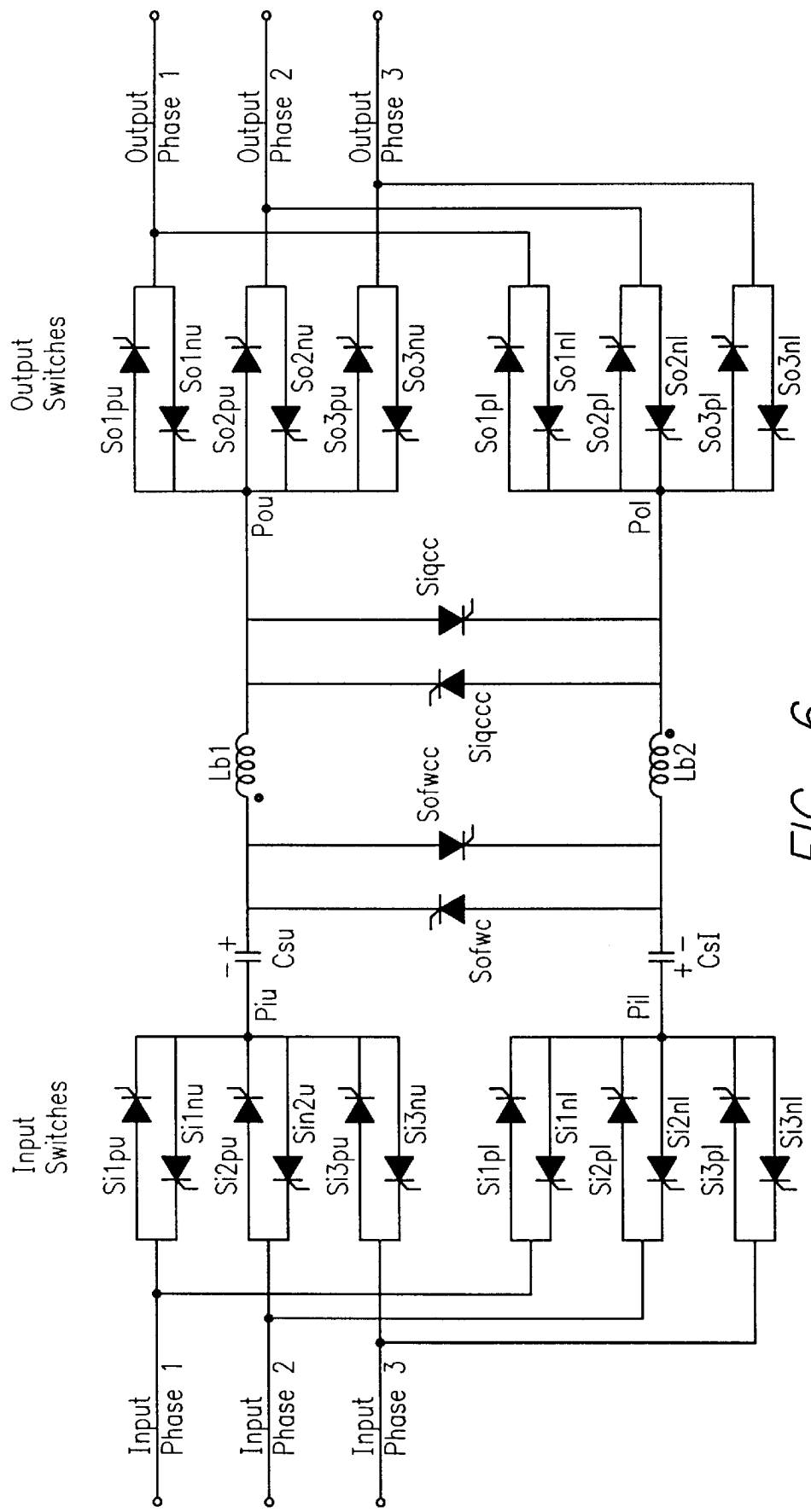
FIG. 6 is an electrical schematic of another embodiment of a power converter with simultaneous input and output operation.

FIG. 6 is an electrical schematic of a power converter utilizing a simultaneous differential and sequential charge interchange process. This circuit is configured as an AC-to-AC power converter, however, the circuit can be equally configured for AC-to-DC rectification, DC-to-AC inversion, and direct DC-to-DC conversion.

The operation of this circuit differs from that of the circuit of FIG. 1 in that energy is directly transferred from the input to the output instead of first transferred from the input to a capacitor and, in a sequential operation, from the capacitor to the output.

The circuit uses the same input switches (Si1pu, Si2pu, Si3pu, Si1nl, Si2nl, Si3nl), output switches (So1pu, So2pu, So3pu, So1nl, So2nl, So3nl) and switch operation, as described in connection with the circuit of FIG. 1, for a clockwise (CW) current flow. However, a second set of input switches (Si1nu, Si2nu, Si3nu, Si1pl, Si2pl, Si3pl) and output switches (So1nu, So2nu, So3nu, So1pl, So2pl, So3pl) permit a counterclockwise (CCW) current flow control.

In the CW operation, a positive phase is switched with the one of the thyristors of Si1pu, Si2pu, or Si3pu to the upper intermediate input terminal Piu, while upper intermediate output terminal Pou is switched with one of the thyristors of So1pu, So2pu, or So3pu to one of the output phases. To complete the circuit, the lower intermediate output terminal Pol is connected through one of the return thyristors of So1nl, So2nl, or So3nl to another output phase, while one of the thyristors Si1nl, Si2nl, or Si3nl is connected to a second one of the input phases to the lower intermediate input terminal Pil. This completes a circuit through the series capacitor Csu and inductor Lb1 forming a series resonant circuit. The second capacitor Csl and second inductor Lb2 are optional, but have been added to form a symmetrical circuit and, in some applications, has other benefits, such as additional isolation.

The selection of the first two input thyristors and the first two output thyristors is identical to that of the circuit of FIG. 1 for the respective charge and discharge operations.

With the polarity of the two capacitors Csu and Csl shown, a clockwise current will build extracting energy from the two connected input phases and directly depositing it into the two connected output phases. When sufficient current has been drawn from one of the input phases, the third input phase is connected through the selected input switch and the charging process continues.

Similarly, if the desired charge has been injected into one of the output phases, the third output phase is connected and the charging process continues. The switching of the third input switch may occur before or after the switching of the third output switch and depends on the input and output phase angles. As the clockwise charging process continues, the polarity of the capacitors as shown reverses and the charge transfer comes to the stop. The charge transfer is a function of the initial capacitor voltage, and it follows that the charge and energy transfer per cycle can be controlled with the voltage amplitude.

If the output voltage is lower than the input voltage, basic theory and modeling projects that the final capacitor voltage amplitude is higher. To control this voltage increase, the free-wheeling switch Sofwc is triggered, stopping any further recharge and transferring the remaining inductor energy to the output. As soon as the current becomes zero, the remaining three switches self-commutate off. The input switches turn off when Sofwc is triggered.

If the output voltage is higher than the input, the final capacitor voltage is lower if the process is permitted to go to completion. To maintain the same voltage amplitude on the capacitor for the subsequent operation, the boost switch Siqcc is triggered, before the inductor current becomes zero. This will terminate further output discharge, but, if triggered at the correct time, will result in the charging of the capacitors to the desired value. The switches Sofwc and Siqcc permit the control of the capacitor voltage and with it the power flow.

With the current stopped and the capacitor polarity reversed, the CCW operation is initiated by triggering one of the selected switches of Si1nu, Si2nu, or Si3nu for the upper intermediate input terminal Piu; So1nu, So2nu, or So3nu for upper intermediate output terminal Pou; So1pl, So2pl, or So3pl for lower intermediate output terminal Pol; and Si1pl, Si2pl, or Sio3nu for lower intermediate input terminal Pil. The two thyristors SofwNcc and Siqcc perform the freewheeling and voltage control in the counterclockwise operation.

For the same condition as described for FIG. 2, with an input phase angle of 80 and output phase angle of 170 electrical degrees, the instantaneous input and output voltages for a 480 V AC power supply are $V_{i1}$=386 V, $V_{i2}$=−252 V, $V_{i3}$=−134 V, $V_{ou1}$=68 V, $V_{ou2}$=300 V, and $V_{ou3}$=−368 V. Using the same methodology as previously described, the switches Si1pu, Si3nl, So2pu, So3nl are triggered to start the CW sequence. Current flows from the positive input phase 1 to the positive output phase 2 with the return from the negative output phase 3 to the negative input phase 3.

With the same resonant period defined by the capacitor and inductors, the thyristor Si2nl is triggered at about 136 μsec, turning off the thyristor Si3nl. At about 300 μsec into the discharge, the positive output thyristor So1np is triggered to off thyristor So2pu.

Because at these phase angles the input voltage is higher than the output voltage ($|V_{i1}|>|V_{ou3}|$), the free-wheeling switch Sofwc is triggered stopping the recharging of the two capacitors. At that point, the input thyristors turn off. At about 334 μsec into the energy transfer duration, the output current becomes zero and the remaining switches turn off. This concludes the CW operation.

The CCW operation has the identical energy extraction from the input and energy delivery to the output and uses the opposite polarity of thyristor for each phase connection. In this process, the current is CCW and the capacitor polarity is charged to its original state.

The cyclic operation permits a nearly 100% duty cycle of power transfer. Both the operating frequency and the capacitor voltage controls the power throughput. Because the voltage can be controlled over large ranges, the throughput per cycle is only limited by the voltage and current limitation of the active and passive components. This circuit permits a high inverter frequency operation independent of the power throughput, since the power can be entirely controlled by the selection of the capacitor voltage. This has the advantage of maintaining a low ripple frequency on both the input and output, when the required power throughput is low. This low ripple frequency can be maintained to zero output power, with the system maintaining the required voltage on the output filter by transferring only the reactive power requirement.

By comparing this circuit with that of the dynamic VAR compensator (DVC) circuit of FIG. 7 described below, this circuit may be operated as a DVC by not using the output thyristors. An obvious extension is to permit the system to control not only the throughput power but in addition to full control of the reactive input power.

VII. Harmonic Compensator

Under the charging operation illustrated in FIG. 2, the AC-to-AC power converter outputs a sinusoidal current in phase with the output phase voltage. Under the charging operation illustrated in FIG. 3, the charge transfer is such that one component of the output current is in phase with the output voltage (real power), and a second component of the output current is out of phase with the output voltage (reactive power).

The current components can be changed in relation to the AC output phase voltage. In general, under the control of modern microprocessor and programmable logic devices, any repetitive output current waveform can be constructed within the reconstruction resolution of the AC-to-AC power converter.

The most general current waveform that can be constructed is given by the Fourier series for the first output phase current:

$$I_{o1} = \Sigma_{n=1}^{n=\infty} [A_n \cos(n\omega_{ou}t) + B_n \sin(n\omega_{ou}t)] \qquad (14)$$

The other two phases are defined by the same current equation, but shifted by 120 and 240 electrical degrees, respectively. The set of all three-phase currents provides, at any point of the output phase $((\omega_{ou}t)$, the charge transfer requirement of all three output phases.

Thus, the AC-to-AC power converter can be configured for the transfer of real power with $B_1$ equal to zero, and as a VAR compensator with $A_1$ equal to zero.

The RCTA can be configured as a harmonic compensator, neutralizing the harmonics on the line generated by other loads in the system. Such a harmonic compensator can be configured in several ways. For example, the harmonic compensator can have the input terminal connected to a power supply, or any other energy storage device, and the output terminal coupled with an AC power system that has harmonics that need to be corrected. The harmonic correction system would supply the net harmonic energy fluctuation during the AC cycle. Furthermore, the harmonic current can be drawn simultaneously with input power.

VIII. VAR Compensator

The RCTA can also be utilized as a dynamic VAR compensator (DVC). A DVC is a VAR compensator with the capability to respond to a change in the reactive power demand or VAR in a fraction of an AC cycle. The DVC can switch the reactive power flow from full leading to full lagging in less than a tenth of a cycle of the AC power supply. This speed permits the use of the DVC as a VAR compensator for flicker control, voltage regulation, and standard VAR compensation.

The DVC is operated at an internal frequency significantly higher than the AC line frequency. In conjunction with a small low frequency cut-off filter, the current drawn by the DVC is harmonic free, meeting all requirements of both IEEE 519-1992 and IEC 555-2.

The circuit operation performs "soft switching" and self-commutation of thyristors, with no switch opening requirement and a relatively low dI/dt requirement. The low dI/dt requirement is important because it permits the use of standard SCR's with both high voltage and high power capabilities. Such devices exist and have been in use since 1970 in the electric utility industry for high voltage DC transmission and other applications. The high voltage and high power thyristor availability permits DVC topology use not only for industrial applications but also for multi-megawatt high-voltage utility applications.

In addition, the SCR is by far the lowest-cost power electronics device, has the lowest conduction losses, and can easily be put in series to yield switches for mega-volt operation. Triggering of such switch assemblies has been fully developed for either direct or fiber optics triggering.

The remaining components are also standard and require no further technological development.

The DVC works on the same resonant DSCI principle as the AC-to-AC power converter described above. For the AC-to-AC power converter, the first charge interchange was a charge operation of capacitor Co with energy drawn from the power source. For the second charge interchange, the charge on the capacitor was discharged into the output terminal. The DVC operation also has two similar charge interchanges; however, under steady state conditions no net energy is transferred between the capacitor Co and the AC power terminal. The net effect is a change of energy between the three AC lines.

Figure 7:
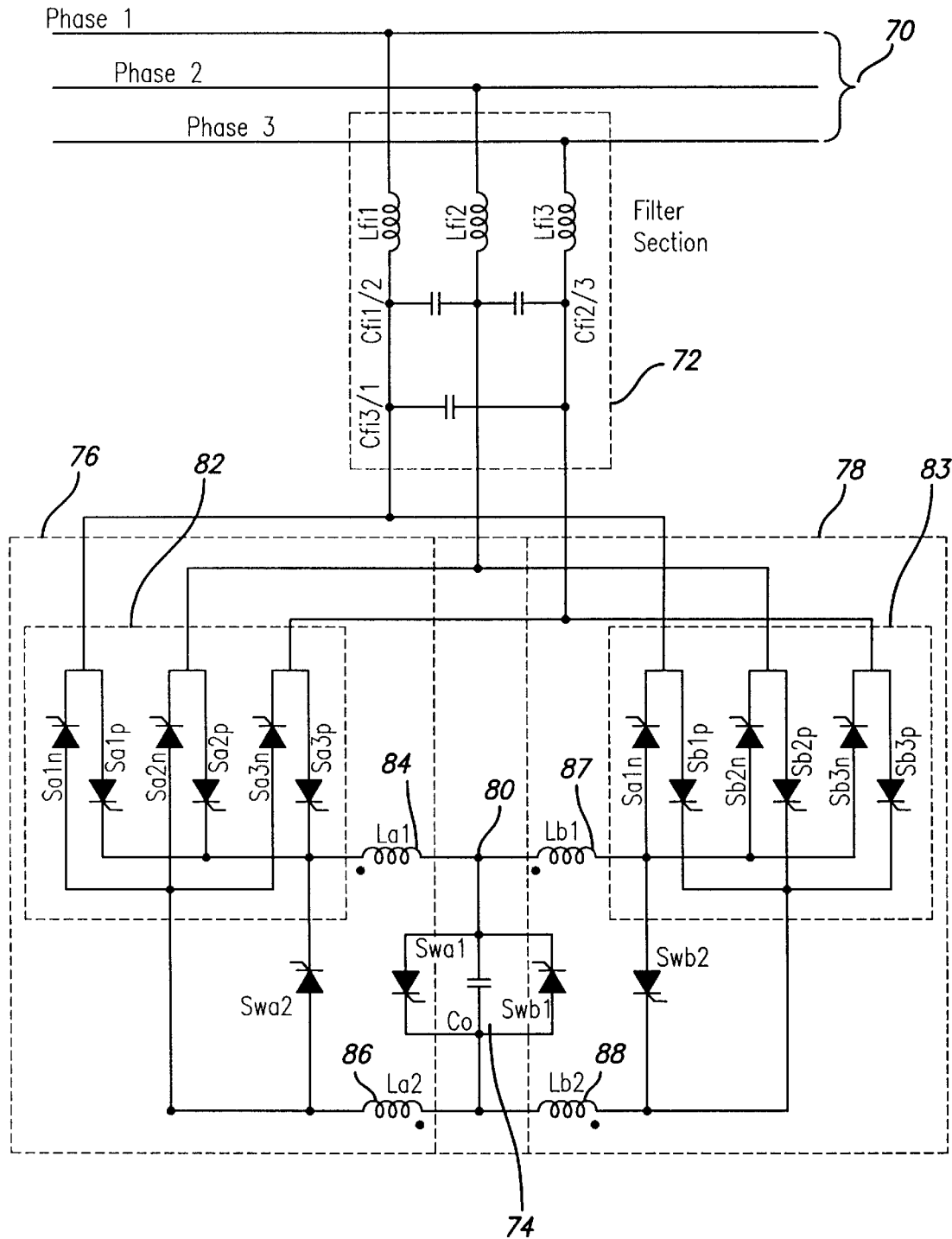
FIG. 7 is an electrical schematic of a dynamic VAR compensator.

FIG. 7 is an electrical schematic of a dynamic VAR compensator. There are several variations of this circuit, but the basic operation is the same or similar.

The DVC can be directly connected to the AC grid 70 without the use of a transformer. This eliminates transformer losses and the cost, volume, and weight of an isolation transformer. A transformer can be used if a different input voltage is required.

The internal operation frequency is selected on the basis of optimizing performance and minimizing component and operating costs. With an operating frequency around 2400 Hz, a cut-off frequency of about 600 Hz is selected for the low-pass input filter 72 to reduce the current ripple to a negligible value. The filtering of high frequencies reduces both the filter capacitor and inductor values. The filter components consist of the Cfi capacitors and Lfi inductors. The filter capacitors are configured in a "delta" configuration, but a "Y" configuration could also be used.

The central component is the capacitor Co 74. This capacitor is typically charged to a residual voltage at the beginning of the charge cycle. There are two charge interchange sections, shown on either side of the capacitor. The "a" charge interchange section 76 is on the left, and the "b" charge interchange section 78 is on the right. These two sections alternately reverse the polarity of the voltage on the capacitor Co and, in the process, draw reactive current from the three AC phases 70.

The "a" charge interchange begins with a negative residual voltage across the capacitor Co. The charging operation starts out by triggering a first switch and a second switch of input switches 82 to connect a first phase and second phase of the AC power supply across the capacitor Co. The charge transfer duration is defined by the value of the inductors La (assuming Co is fixed as determined by other considerations). The "a" section inductor La is shown as two inductors, La1 84 and Lb2 96. The "b" section inductor Lb is shown as two inductors, Lb1 87 and Lb2 88. All four inductors can be replaced by one inductor in series with the capacitor Co.

The charge transfer begins as half of a sine wave. Part way through the "a" charge interchange, the desired charge transfer of the second phase is obtained, and the thyristor for the third phase subsequently triggers. The charging sequence is selected such that the activation of the third phase thyristor back-biases the second phase thyristor to self-commutate it off. The charge transfer continues and concludes when the current through the capacitor becomes zero. At this point, the two conducting thyristors self-commutate off to complete the charge cycle.

The "b" charge interchange is initiated after the charge cycle. The "b" charge interchange section is configured to make the identical charge interchange with the AC grid as the "a" charge interchange section 76. The "b" charge interchange section 78 circuit differs from the "a" charge interchange section 76 in that its connection to the capacitor Co 80 is reversed from that of the "a" charge interchange section 76. Because of this reversed connection, the capacitor Co voltage filly reverses polarity. Thus, no net power is drawn or transferred to the grid, since the energy in the capacitor Co is unaltered.

Figure 8:
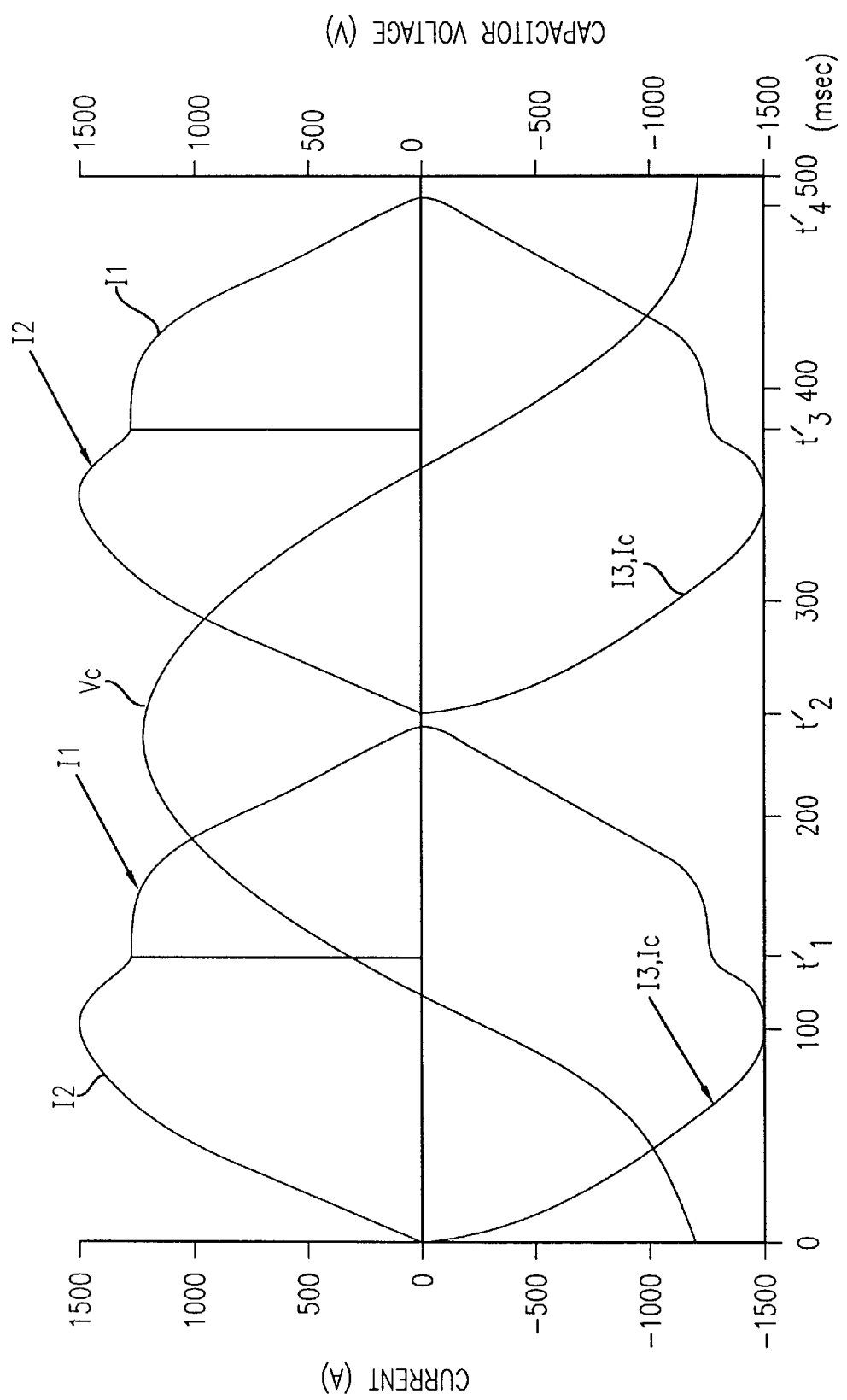
FIG. 8 is a graph of a typical charge interchange waveform of the dynamic VAR compensator, shown in FIG. 7, with two cycles of operation.

FIG. 8 is a graph of a typical charge interchange waveform with two cycles of operation of the dynamic VAR compensator shown in FIG. 7. The components have been selected for a total charge interchange frequency of 4000 Hz, completing 2000 cycles per second for both "a" and "b" charge interchange. This operation is obtained with Co=100 $\mu$F and La+Lb=40 $\mu$F. The selected AC voltage is 480 V, and the interchange waveforms shown in FIG. 8 are for an input phase angle of 40 electrical degrees. The free-wheeling switches Swa and Swb, shown in FIG. 7, are not required for the operation. Nonetheless, the switches, in parallel with capacitor Co (Swa1 and Swb1) or in series with Co (Swa2 and Swb2), increase control flexibility.

The input voltage and the reactive current are defined by the equations as follows:

$V_1 = V_0 \sin(\omega t) = 252V$     $I_{r1} = I_{r0}\cos(\omega t) = 39.7A$ $V_2 = V_0 \sin(\omega t - 2\pi/3) = -386V$     $I_{r2} = I_{r0}\cos(\omega t - 2\pi/3) = 59.6A$ $V_3 = V_0 \sin(\omega t + 2\pi/3) = 134V$     $I_{r3} = I_{r0}\cos(\omega t + 2\pi/3) = -99.3A$.

Assuming that the residual voltage of the capacitor Co is −1200 V, from either the previous operation or by precharging with the input waveform, the charge interchange is as follows.

Using the generalized method for charging, the input thyristors Sa2p and Sa3n are triggered at t'=0, connecting phase voltages $V_2$ and $V_3$ across the capacitor Co. The current Ic in the inductors La1 and La2 builds, drawing charge out of phase 2 and injecting the same charge into phase 3, as shown in FIG. 8.

Part way through the charge cycle, at t'$_1$, the thyristor Sa1p is triggered. Because $V_1$ is more positive than $V_2$, the thyristor Sa2p is back-biased and self-commutates off. The charge interchange continues with phase 1 and phase 3. At t'$_2$=244 $\mu$sec, the current decays to zero and the two conducting thyristors, Sa1p and Sa3n, are back-biased and turned off.

The triggering at t'$_1$ is defined by the magnitude of reactive current of the three phases, $I_{r1}$, $I_{r2}$, and $I_{r3}$. Triggering at t'$_1$=134 $\mu$sec will yield a charge transfer proportional to the reactive current requirements and will result in a capacitor voltage equal to the initial residual voltage but opposite in polarity.

An earlier triggering of Sa1p will result in the charging of the capacitor to a higher voltage, drawing, in addition to the reactive power, some real power. This increase in the capacitor voltage may be desirable in order to make up for the component losses or for the purpose of increasing the reactive power flow without having to change the DVC frequency. On the other hand, a delayed triggering results in the transfer of part of the capacitor energy back into the AC power system. For a practical system, the time t'$_1$ may be either calculated in real time or pre-calculated and stored in a reference table. The stored value is a function of the input phase angle and the capacitor voltage.

For the "b" charge interchange section the same generalized method for charging is used. The "b" charge interchange begins at t'$_3$=250 $\mu$sec by triggering thyristors Sb2p and Sb3n. This again connects the capacitor Co across phase 2 and phase 3 with the correct polarity. The only difference between the "b" operation is that the current through the capacitor has an opposite polarity. As shown in FIG. 8, the current flow into the phases during the "b" discharge interchange is identical to the current drawn during the "a" charge interchange, with no net energy transfer form the AC power supply.

At 134 $\mu$sec from the start of the discharge cycle, that is, at t'$_4$=384 $\mu$sec, the thyristor Sb1p is triggered, forcing off Sb2p while Sb3n remains on. The discharging process continues until about t'$_5$=494 $\mu$sec when the current decays to zero and Sb1p and Sp3n turn off, leaving the capacitor in the original voltage state.

For consecutive charge transfer, the line voltages and current requirements will cyclically change. Thus, the triggering sequence and timing must be determined according to the current phase angle. The average reactive current flow is the charge delivered during the time interval between the charge transfers. It follows that the reactive current can be controlled by the frequency of operation. In addition, the reactive current is also a function of the residual voltage of the capacitor Co. This voltage can, in principle, be built up to any value and is only limited by the voltage and current ratings of the thyristors and the capacitor Co. This is a major advantage, because, typically, the VAR requirements increase as the line voltage droops. Using simple capacitor banks, the VAR current is proportional as the voltage droops, while with the DVC the reactive current can be increased independent of the line voltage.

From an efficiency point of view, the reactive current passes through only one set of thyristors per phase. This not only offers simplicity and higher reliability but also reduces the losses to a minimum.

IX. Electronic AC Transformer a. AC-to-AC Operation

The AC-to-AC power converter shown in FIG. 1 can provide an output voltage waveform that meets the voltage, frequency, and output phase requirements. If the output frequency is the same as the input frequency, the AC-to-AC power converter can be used as a regulated AC power supply.

For some applications, such as, variable-speed AC motors, it is desirable to vary the output frequency and output voltage. Although the AC-to-AC power converter can transfer energy from a lower voltage terminal to a higher voltage terminal, its voltage "transformation" is limited. A standard AC transformer can be connected to the AC input or AC output to yield a regulated or controlled AC output with voltage transformation. However, such a system still has the disadvantages of having a large three-phase AC transformer in the loop.

Figure 9:
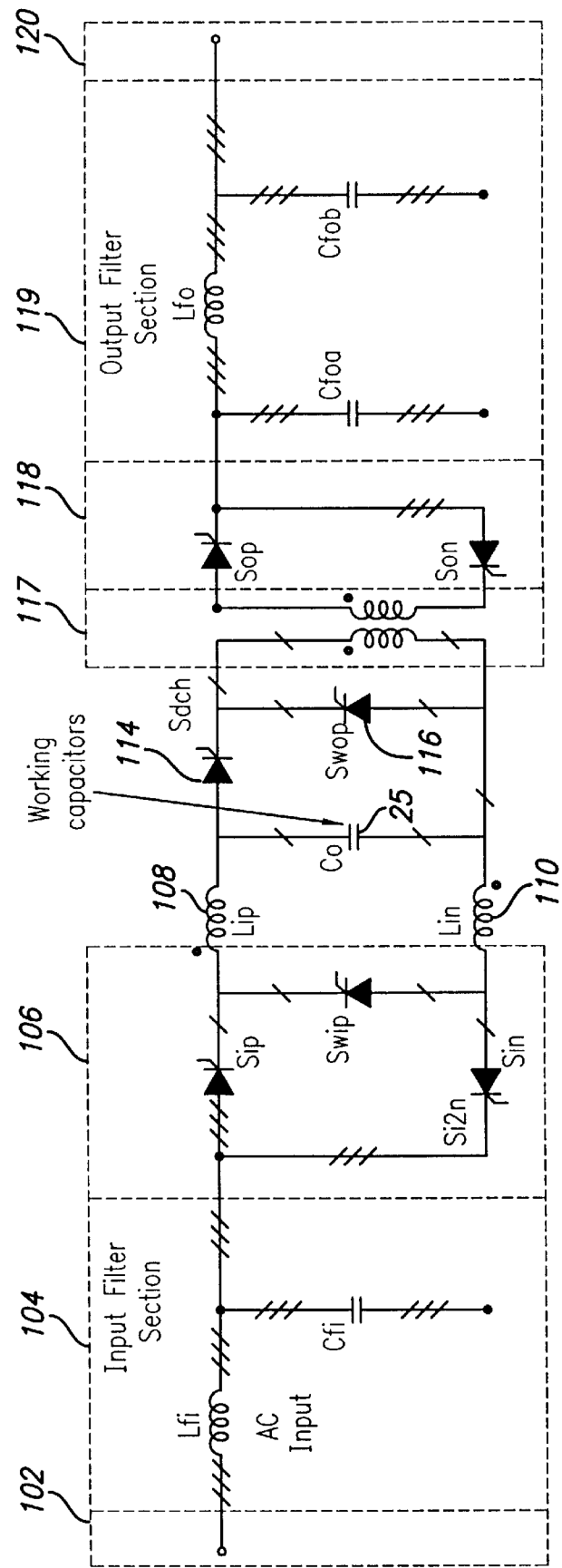
FIG. 9 is an electrical schematic of an electronic transformer that combines frequency control with voltage transformation.

FIG. 9 is an electrical schematic of an electronic transformer that combines frequency control with voltage transformation. The schematic is drawn as a single-line diagram with the number of slash lines indicating the number of phases or terminals. The electronic transformer operates under similar principles as the AC-to-AC power converter shown in FIG. 1. A major difference is that a single-phase transformer replaces the output inductors.

The AC power supply is applied to an input terminal 102, which is coupled to the capacitor Co 25 via an input filter 104 and input switch section 106. The value of input inductors 108 and 110 determine the charging duration (assuming Co is fixed as determined by other considerations).

The input section charge operation is identical to that of the AC-to-AC power converter shown in FIG. 1.

The discharge section is similar to that of the AC-to-AC power converter shown in FIG. 1, having an output switch section 118 coupled to an output terminal 120 via an output filter 119. The discharging inductors Lb1 and Lb2 have been replaced with a transformer 117, which provides the inductance. In addition, a primary output thyristor Sdch 114 has been added, which disconnects the transformer 117 from capacitor Co during the charging cycle.

The primary to secondary turns ratio of the output transformer 117 is selected to match the desired voltage ratio between the AC input voltage and the AC output voltage. Further, the leakage inductance as seen from the primary of the transformer is selected to match the output inductor values of Lb1 and Lb2 shown in FIG. 1.

The shunt inductance of transformer 117 can be selected to be much higher than the leakage inductance. Thus, the shunt inductance can be ignored for most circuit operations. The sum of the inductance of windings is the effective transformer leakage inductance, and, together with Co, defines the discharge period.

The capacitor energy is discharged into the AC output phases in a similar manner as for the AC-to-AC power converter.

Using the general method of discharging, the thyristor Sdch 114 is triggered simultaneously with the positive thyristor Sop and the negative thyristor Son of the phases with the highest and second highest output voltage requirements (assuming unit power factor output). This couples the capacitor $C_o$ to the output phases via output filter 119 and transformer 117. When sufficient energy is transferred to the output phase with the second highest output voltage requirement, the thyristor with the lowest output voltage requirement triggers. This will turn off the thyristor for the second highest output, and the charging continues for the lines with the highest and lowest output requirements.

The free-wheeling thyristor Swop 116 can be triggered to prevent the recharging of the capacitor Co or to select the residual voltage of capacitor Co. The triggering transfer the energy in the leakage inductance to the output. When the current becomes zero, the commutating thyristors turn off and the discharge cycle is complete.

The voltage transformation can be a step-down, step-up, or isolation. The operation permits a frequency change, phase change, or both. The output can be controlled to permit both real and reactive power control with the input preferably restricted to draw only real power. Thus, the electronic transformer can be simultaneously a voltage regulator and VAR compensator. Additionally, this transformer can draw a balanced input even if the output is imbalanced. Because the single-phase transformer is operated at high frequency, its cross-section can be significantly reduced over that of a standard 50 or 60 Hz transformer. The transformer may even be more effectively used if the magnetic flux is reversed for every discharge cycle. Several approaches are available. For example, two input sections with six additional output thyristors would yield a nearly full transformer duty cycle.

This type of transformer has several additional advantages. It provides a significant reduction in both weight and volume and yield additional operational benefits that conventional power transformers can not deliver. Unlike a regular transformer drawing continuous magnetizing current, this transformer is magnetized only during the power transfer. This implies that the losses in the thyristors and the transformer are a constant fraction of the instantaneous throughput. Since most utility transformers have an average load factor of less than 30% of the peak load factor, the electronic transformer will not only increase the power quality through its regulation and neutralize the VAR from the load but also obtain a higher efficiency for most applications.

b. AC-to-DC Operation and DC-to-AC Operation

The electronic transformer configuration of FIG. 9 permits the reconstruction of an AC output. A positive voltage can be reconstructed on one output phase and a negative voltage on a second phase, as described in the above AC-to-DC rectifier, to provide a DC power source on the output.

As with the AC-to-DC rectifier, certain output switches on the secondary of the transformer can be eliminated. In addition, the two output switches can be replaced by diodes, because the output switching is performed on the primary of the transformer by thyristor Sdch. If the voltage of the output of the transformer secondary is reversed with a dual input modules operation, the half-wave rectification on the output is replaced by a full single-phase bridge rectification configuration.

For DC-to-AC operation, the modification to the input circuit is as described in the previous paragraph. This permits the utilization of a DC power source and the reconstruction of an AC waveform or power injection into an AC power source.

The transformer permits a significantly higher voltage difference between input and output. The step-up or step-down ratio is selectable by the turns ratio of the single-phase transformer.

The next extension of this circuit is to perform direct DC-to-DC conversion over a large range of DC input voltage to DC output voltage.

In addition the utilization of a transformer permits the full galvanic isolation between the input and output for all of the conversion processes described.

X. Electronic Transformer with Simultaneous Input and Output Charge Exchange

The electronic transformer illustrated in FIG. 9 uses two multi-terminal DSCI operations, one to charge Co and a subsequent one to discharge Co. The operations alternate, thus the electronic transformer having a duty cycle of about 50%. Approximately half the time is utilized for charging and the other half for discharging. In addition, the charge per phase flows through 2.5 thyristors on average.

Figure 10:
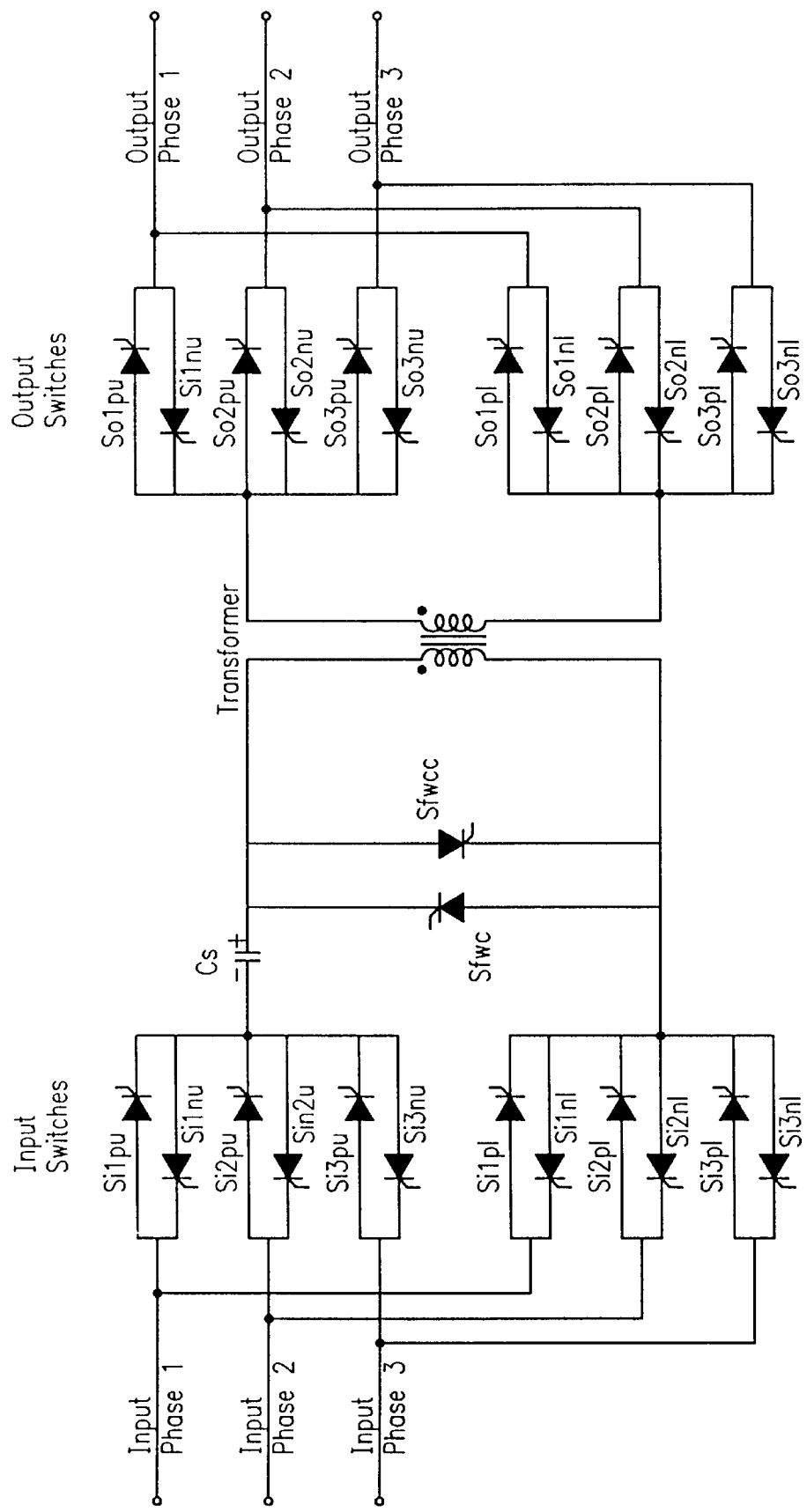
FIG. 10 is an electrical schematic of electronic transformer with simultaneous input and output operation.

FIG. 10 illustrates another embodiment of an electronic transformer. This transformer significantly increases power throughput. The duty cycle nears 100% and the power passes through one less thyristor, yielding a higher efficiency.

This modified transformer differs from the previously described electronic transformer in that the charge operation and discharge operation occur simultaneously. The charge drawn from the AC input terminal is directly transferred to the AC output terminal.

The modified electronic transformer is based on the "simultaneous input and output charge exchange" power converter of FIG. 6 and replaces the output inductors by a single-phase transformer as in the electronic transformer of FIG. 9. The modified electronic transformer of FIG. 9 is shown with one capacitor, because the single-phase transformer yields full galvanic isolation between the input and output. The single-phase transformer not only has the required turns-ratio for voltage transformation but also is designed such that is has a leakage inductance to duplicate the resonance function of Lb1 and Lb2 in FIG. 6.

As for the circuit of FIG. 6, the input and output operation occur in the same cycle, performing simultaneously the DSCI operation introduced earlier. The triggering sequence for both the input and output thyristors is as previously described.

The single-phase transformer of FIG. 10 is selected to provide the necessary turns ratio for the voltage transformation and to yield the desired leakage inductance that defines, in conjunction with the capacitor Cs, the resonance and energy transfer period Two sets of thyristors are connected to each of the input and the output terminals. Using as for the earlier demonstration a 80 degree input and 170 output phase angle, and a negative polarity for Cs as shown, the same input thyristors Si1pu and Si3nl, simultaneously with the two output thyristors So2pu and So3nl, are triggered to start the CW operation. During part of the transfer period, Si2nl is triggered to turn off Si3nl, while triggering So1np at the correct time, turns off the output thyristor So2pu. Again the freewheeling switch Sfwc controls the recharge voltage of Cs and permits the transfer of the energy in the leakage inductance of the single-phase transformer to the output.

With the selection of an appropriate transformers turns ratio, the function of the switches Siqcc and Siqccc shown in FIG. 6 can be eliminated, reducing the number of required components, because the input voltage is larger than the effective output voltage as seen from the primary of the transformer.

At the end of the CW energy transfer, the capacitor polarity is reversed and all the thyristors are turned off. At that point the CCW current flow is initiated following the same procedure; however, with the input voltage, the output voltage, and the magnetic flux of the transformer reversed. The high inverter frequency operation and the flux reversal reduce the size and weight of the single-phase transformer. In addition, as the power requirement is reduced, a lower inverter frequency or capacitor voltage may be selected. The result is, unlike a regular transformer were the magnetizing losses remain the same, that the losses of this transformer are reduced with the power transfer requirement. The net result is a nearly constant efficiency over the full load factor range of the electronic transformer.

For AC-to-DC operation, the same circuit is applicable and only two output terminals are required. For a positive voltage on output phase 1, and negative voltage on output phase 3, only the output thyristors of So1pu, So1pl, So3nu, and So3nl, are required, and the remaining eight output thyristors can be removed.

Similarly for DC-to-AC or DC-to-DC operation, only the input thyristors Si1pu, Si1pl, Si3nu, and Si3nl are needed. For the CW cycle, the thyristors So1pu and So3nl are triggered and remain on for the CW cycle, while the thyristors So1pl and So3nu are used for the CCW. These thyristors commutate off at the end of each respective charged and energy transfer cycle.

In summary the series capacitor resonance circuit of FIG. 6 can be modified to yield the electronic transformer circuit of FIG. 10. This circuit permits, with the proper control, the draw of harmonic free current and the delivery of harmonic free power. With AC power, not only is the real power controlled, the reactive power can be simultaneously drawn to provide a selectively leading or lagging input current. The single-phase transformer turns-ratio permits either a step-up or step-down of the output voltage. Unlike a regular AC transformer, the output is not restricted to the AC input frequency and phase and the output voltage can be regulated. Furthermore the input and output is not restricted to AC, permitting also DC-to-AC, AC-to-DC, as well as direct DC-to-DC operation.

XI. Power Converter in an Alternate Operational Configuration a. Circuit and Uni-directional Operation The DSCI method is not limited to a single-capacitor charge storage device, a three-phase input, or a three-phase output. The DSCI operation can be utilized with a standard resonant charge interchange configuration, that is, with a capacitor paired up with each input terminal or output terminal. The standard resonant charge interchange technique is described in. for example, U.S. Pat. No. 5,764,501.

Figure 11:
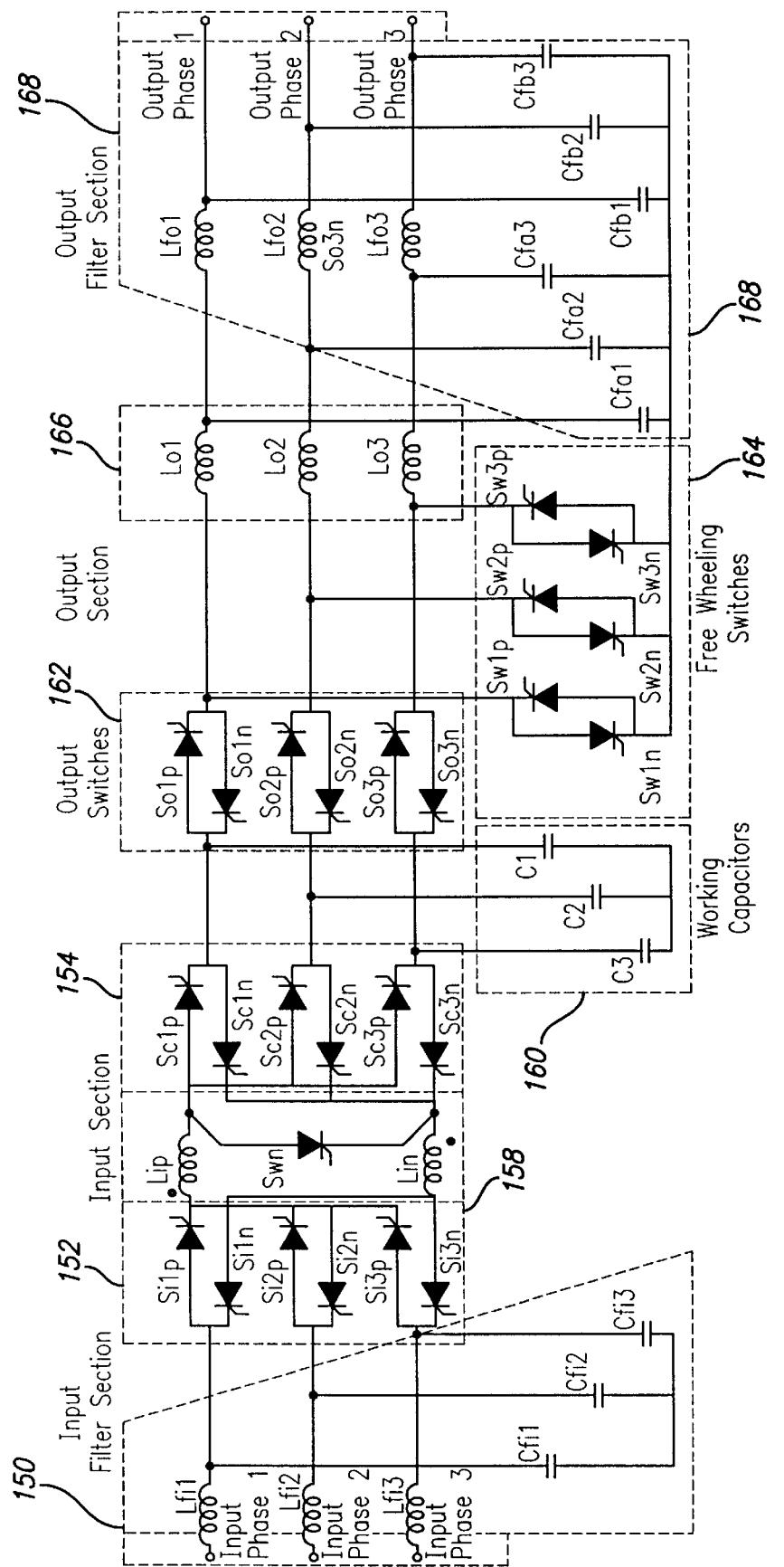
FIG. 11 is an electrical schematic of power converter using three capacitors.

FIG. 11 is an electrical schematic illustrating an alternate embodiment of an AC-to-AC power converter. The three-phase power supply is coupled to a low-pass input filter 150, comprising of a series inductor $L_{fi}$ and shunt capacitor $C_{fi}$ per phase. The capacitors may be either connected in the "Y" or "delta" configuration. On the output a similar low-pass output filter 168 is used. The one shown is a typical "pi" filter consisting of $C_{fa}$, $L_{fo}$, and $C_{fb}$.

The power converter operation consists of two operation cycles. The first cycle is the charge cycle, which extracts energy from the AC power supply and charges the capacitors 160 (C1, C2, and C3). For this purpose, six input thyristors (Si1p, Si2p, Si3p, Si1n, Si2n, Si3n) of input switch section 152 are employed.

The input switch section 152, coupled between the low pass filter 150 and an input inductive section 158 having inductors Lip and Lin, selects the power drawn from lines of the AC power supply. These thyristors of input switch section 152 will hereafter be referred to as input switches.

A second set of six thyristors (Sc1p, Sc2p, Sc3p, Sc1n, Sc2n, Sc3n) of capacitor selection section 154 is coupled between an input inductive section 158 and the capacitors section 160 having capacitors C1, C2, and C3. These thyristors will hereafter be referred to as capacitor selection switches. The capacitor selection switches determine the polarity and the voltage level to which the capacitors C1, C2, and C3 are charged. The capacitor selection switches are shown as thyristors, but other switches may be used. Importantly, no opening of the switches is required in this circuit, though opening switches may be used to simplify some operations at the cost of an increase in expense and switch losses.

For normal AC-to-AC power conversion, it is desirable to draw harmonic-free input power at a unity power factor. Thus, energy that is proportional to the square of the instantaneous input voltage is extracted from each input line.

By repeating this process at a high frequency, as opposed to the input line frequency, the input filter will average out the power flow, yielding a sinusoidal input current and input power.

Also, the throughput power can be regulated by changing the operation frequency. The procedure is to extract, during one or possibly over several charge cycles, an amount of energy such that the average power throughput is proportional to the square of the input voltage. The energy extraction requirement is a function of the input phase angle ωt, where ω is the input line angular frequency. To reconstruct a sinusoidal output, it is necessary to charge each of the three working capacitors to a voltage proportional to the output waveform defined by the output phase angle ω't, where ω' is the angular output frequency. Over several cycles, the charging process must extract energy from the input with an angle from zero to 360 electrical degrees and must charge the capacitors to a voltage and polarity that represents any output phase angle from zero to 360 electrical degrees. This process will be described with reference to FIG. 11, the voltage and current waveforms shown in FIG. 12, and Table 1.

For illustration purposes, an instantaneous input angle of 80 electrical degrees and an output angle of 170 electrical degrees are selected. For a three-phase, 480 V AC system, the input phase voltages are shown in Table 1. The first input line is positive, while the other two lines are negative, and the sum of the three voltages is zero. The sum of the three voltages is always zero for a balanced line, and the same rule also applies to the current. Harmonic-free power will be drawn. The charge energy per line is given in column 3 as a percentage of the total charge energy. However, with a low-pass filter, the option exists to average currents over several cycles.

Exemplary load voltage requirements are given in Table 1, column 4, for a 480 V three-phase system output waveform with an instantaneous phase angle of 170 electrical degrees. In this example, the first two output phases are positive and the third output phase is negative. Again, the sum of the three output phases is zero.

To charge the capacitors correctly and obtain a balanced power flow, the energies in the three capacitors must be related to each other by the square of the specified output voltage. This charge energy is given in the last column of Table 1. Typically, to permit the full discharge of the charged capacitors into the output filter, the polarities of the capacitor must be identical to the polarity of the output voltage, and the charge voltage of each capacitor should be proportional to, and more than twice, the voltage requirement of the corresponding output phase. If the charge voltage is not sufficiently high, a full discharge may not occur.

The following operation describes the charging of a set of three capacitors, matching the output phase angle, from the input terminals. This operation sequence is selected because it permits the use of switches that do not have to be triggered open. The circuit permits self-commutation of devices such as thyristors that turn off after being back-biased.

Using the generalized method for charging, thyristor Si1p is triggered because phase 1 has the highest absolute-value phase voltage. Of the two remaining input phases, thyristor Si3n is triggered because it is opposite in polarity to thyristor Si1p and has a less negative voltage value. This will drive the input of the upper inductor Lip 156 to +385.9 V, while the lower input inductor Lin 158 becomes −134.0 V.

TABLE 1

Input and Output Voltages and Energies

|  | Input Voltage at 80 degrees | Input Energy (%) | Output Voltage at 170 degrees | Output Energy (%) |
| --- | --- | --- | --- | --- |
| Phase 1 | 385.9V | 64.7% | 68.1V | 2.0% |
| Phase 2 | −251.9V | 27.5% | 300.2V | 39.1% |
| Phase 3 | −134.0V | 7.8% | −368.3V | 58.9% |

Because capacitor C3 requires the highest absolute value voltage and is negative, thyristor Sc3n is triggered to couple capacitor C3 to the negative inductor Lin. Next, either C1 or C2 can be connected to the positive inductor Lip. For highest power operation with reduced charging time, the capacitor requiring the lower output energy is connected. For the current example, Sc1p is triggered to couple capacitor C1 in series with capacitor C3

Alternately, Sc2p could be triggered in order to permit maximum thyristor switch recovery time. Either way, the thyristors will self-commutate off.

Closing the fourth switch Sc1p couples a resonant LC circuit between input phases 1 and 3. The inductor value is the sum of Lip and Lin, and the capacitor value is half that of an individual capacitor because the capacitors are connected in series. The voltage and current are described in terms of time with the following equations:

$$I_c(t) = I_o \sin(\omega_o t) \qquad (15)$$

$$Vc_1(t) = -Vc_3(t) = (Vp_1 - Vp_3)(1 - \cos(\omega_o t))/2 \qquad (16)$$

where, $$I_o = (Vp_1 - Vp_3)\sqrt{C_o/2(Lip + Lin)}$$

and $$\omega_o = 1/\sqrt{C_o Li/2}.$$

The capacitor charge voltage and charging current can be precisely calculated. The time a capacitor requires to reach a desirable voltage can be computed using inverse trigonometric functions.

With the present switch selection, the capacitor C1 charges to about twice the voltage requirement of output phase 1. This voltage is obtained in $t_1=66$ μsec with an inductor rating of 80 μH and capacitor rating of 100 μF, as shown in Table 2.

At $t_1$, the positive capacitor selector switch Sc2p is triggered. The charging of capacitor C2 is started, while the charging of C3 continues. The power is still extracted from the same two input phases 1 and 3.

Because the voltage of capacitor C2 is less than the voltage of capacitor C1, the switch Sc1p is back-biased and will stop conducting if it is a unidirectional switch, such as, a thyristor. Thus, silicon controlled Rectifiers (SCRs) can be used instead of switches that require triggering to turn off.

TABLE 2

Switching Time, Current and Capacitor Voltage

| Time (μsec) | Current (A) | Vc1 (V) | Vc2 (V) | Vc3 (V) | Input Switches | Selector Switches |
|---|---|---|---|---|---|---|
| 0+ | 0 | 0 | 0 | 0 | Si1p-Si3n | Sc1p-Sc3n |
| 66 | 360.1 | 131 | 0 | −131 | Si1p-Si3n | Sc2p-Sc3n |
| 93 | 455.4 | 131 | 111 | −242 | Si1p-Si2n | Sc2p-Sc3n |
| 222 | 0 | 131 | 574 | −705 | | |

Figure 12:
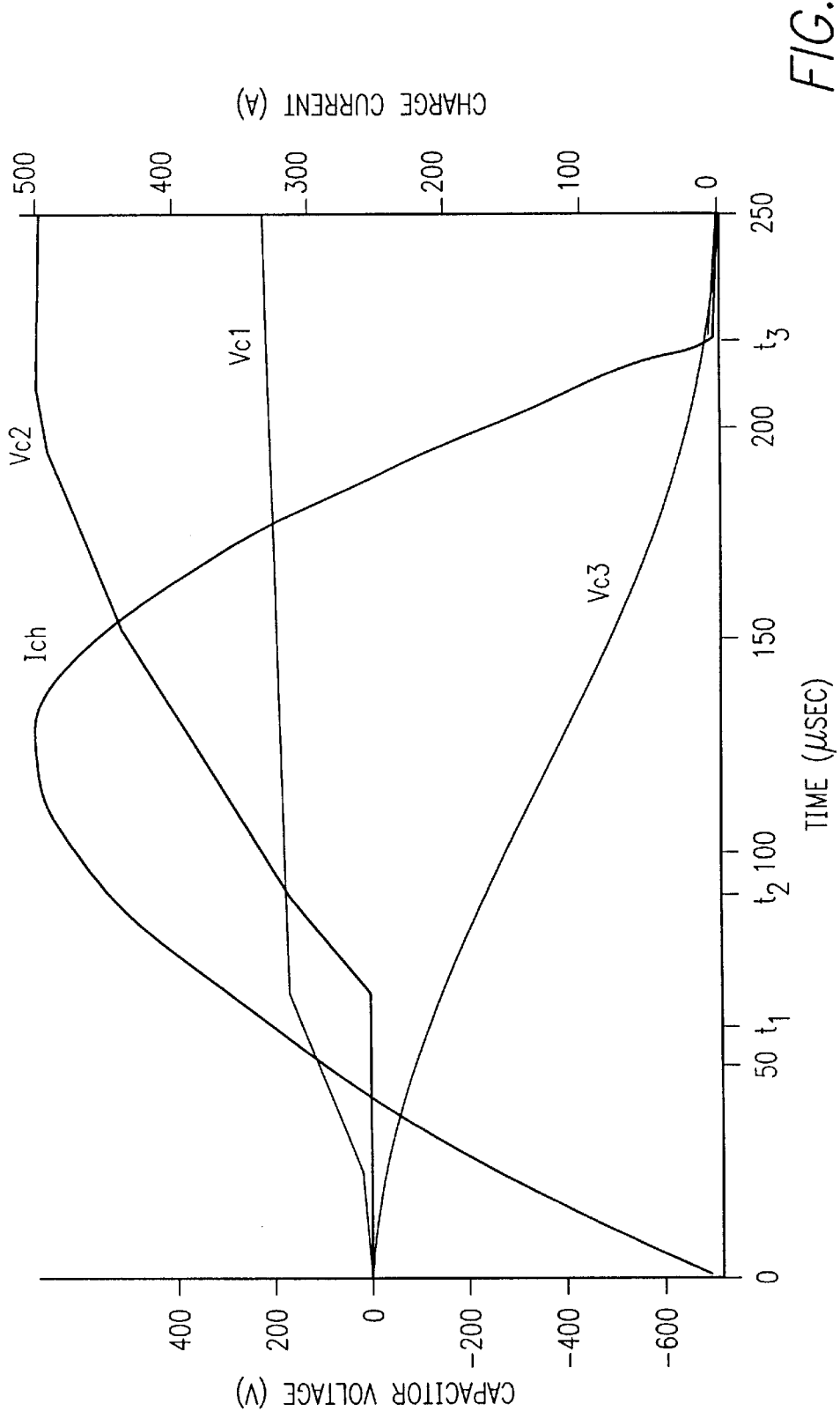
FIG. 12 is a graph of the capacitor voltages and charge currents for the power converter using three capacitors, shown in FIG. 11, for a typical charging process.

FIG. 12 illustrates the capacitor voltage waveforms Vc1, Vc2, and Vc3 and the charging current waveform Ich. The computation of the charging current and capacitor voltages follow the same mathematics, with the current from the first part of the discharge and the voltage of capacitor C3 from the first charging segment used as the initial conditions.

At $t_2=93$ μsec, the energy extracted from the input phase 3, which is the integral of the charge current times the input phase 3 voltage, reaches a predetermined value and triggers the input switch Si2n. Because the input phase 2 voltage is more negative than the input phase 3 voltage, the input switch Si3n is back-biased and the SCR self-commutates off. The charging voltage is now the difference between the voltages on input phase 1 and input phase 2. The new initial condition at $t_2$ determines the remaining current and charging voltages for C2 and C3.

At $t_3=222$ μsec, the charging current becomes zero and all four switches, Si1p, Si2n, Sc2p, and Sc3n, become back-biased and commutate off. The trigger points $t_1$ and $t_2$ are calculated such that the energy ratio of the charged capacitors is proportional to the output voltage ratio squared.

On the input side, the selected triggering sequence and trigger timing of $t_1$ and $t_2$ define the correct input energy on all three phases. The charge energy is proportional to the instantaneous power of a balanced three-phase line at the specified input phase angle. The input energy distribution is defined by the triggering time of the third input charge switch (in this example, Si2n at $t_2$). The correct charge distribution of the capacitor is defined by the timing of the third capacitor selection switch (in this example, Sc2p at $t_1$).

The same procedure is used for other input phase angles, from 0 to 360 electrical degrees and other output phase angles. In all cases, the triggering of switches at $t_0$, $t_1$, and $t_2$ is required with the exception of instances when either an input or output phase voltage is zero. In the previous example, the switching of the distribution section occurred before the switching of the input section. This occurs only 50% of the time, whereas at other times the capacitor is changed after the input phase is changed. The computation of the trigger times $t_1$, and $t_2$ can either be computed in real time or the timing can be stored in a two-dimensional reference table as a matrix of the input and output phase angles.

With the capacitors charged, the output switches of output section 162 can be triggered simultaneously to resonantly discharge the three capacitors into the output phases. The discharge period is determined by the values of the capacitors in conjunction with the discharge inductors Lo1, Lo2, and Lo3. Because, by definition, the sum of the positive charges and the negative charges are equal, it is not necessary for the three capacitors to be coupled to a neutral. If the voltages in the three capacitors are identical to a value about twice the output terminal voltage, the discharge current becomes zero simultaneously with the capacitor voltage decaying to zero.

Because this condition can rarely be realized, three of the six free-wheeling switches of a free-wheeling switch section 164 are triggered. This prevents the capacitors from being recharged and transfers the remaining energy, stored in the three output inductors, into the output phases. At the same time, the output switches are commutated off, and permit, after full switch recovery, the capacitors to be recharged. For the next charge and discharge process, both the input phase angle and output phase angle change as a result of the time increase $\Delta t$, where $\Delta t$ is the time between the consecutive charge or discharge events.

Using the charge sequence, the energy extracted from the input is proportional to that of a balanced load condition. Unlike charging three individual capacitors from three separate input lines, where the total charge energies are always identical, the charge sequence produces a small difference in the total charged energy from one charge to the next. The energy per charge can be described by, $$E(V_{rms}, \omega, \omega') = \Gamma(\omega, \omega') E(V_{rms}) \qquad (17)$$

where $$E(V_{rms}) = 2C_o V_{rms}^2. \qquad (18)$$

The parameter $\Gamma(\omega, \omega')$ is both a function of $\omega$ and $\omega'$ and has an amplitude fluctuation similar to an unfiltered rectified output DC voltage.

The average output power is given by, $$P(V_{rms}, f) = E(V_{rms}) f / \Gamma(\omega, \omega') \qquad (19)$$

where $f$ is the average charge or discharge frequency. The parameter $\Gamma(\omega, \omega')$ is a continuous function of the input and output phase angles and can either be calculated or stored in the same reference table as $t_1$, $t_2$, and the charge sequence.

The time interval between discharge cycles is given as a function of the average power as $$\Delta t = E(V_{rms}, \omega, \omega') / (P_{av} \Gamma(\omega, \omega')) \qquad (20)$$

Since the throughput power and output frequency can be changed from one charge cycle to the next, the change can occur in a fraction of an AC cycle. The limiting factors are the responsiveness of the low-pass input and output filters.

With a charging period of 220 μsec and a discharge duration of 180 μsec, the converter can be operated at a frequency of 2500 Hz. For the specified capacitor value this yields a throughput power of 115 kW.

Figure 13:
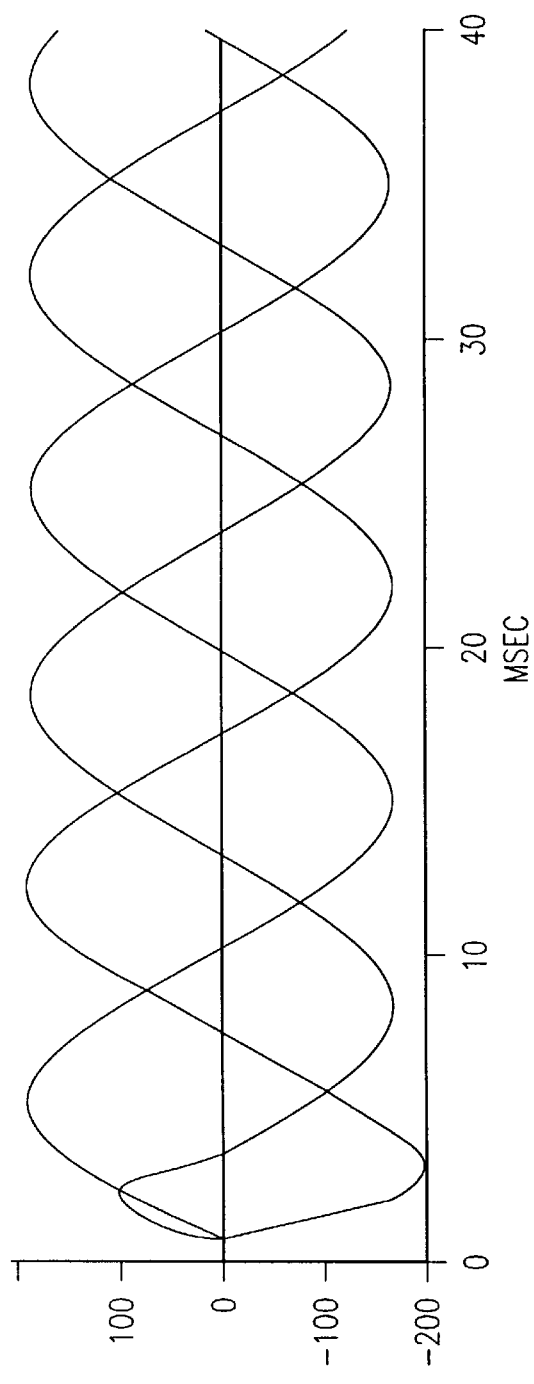
FIG. 13 is a graph of several cycles of the voltage and current inputs for the power converter shown in FIG. 11.
Figure 13:
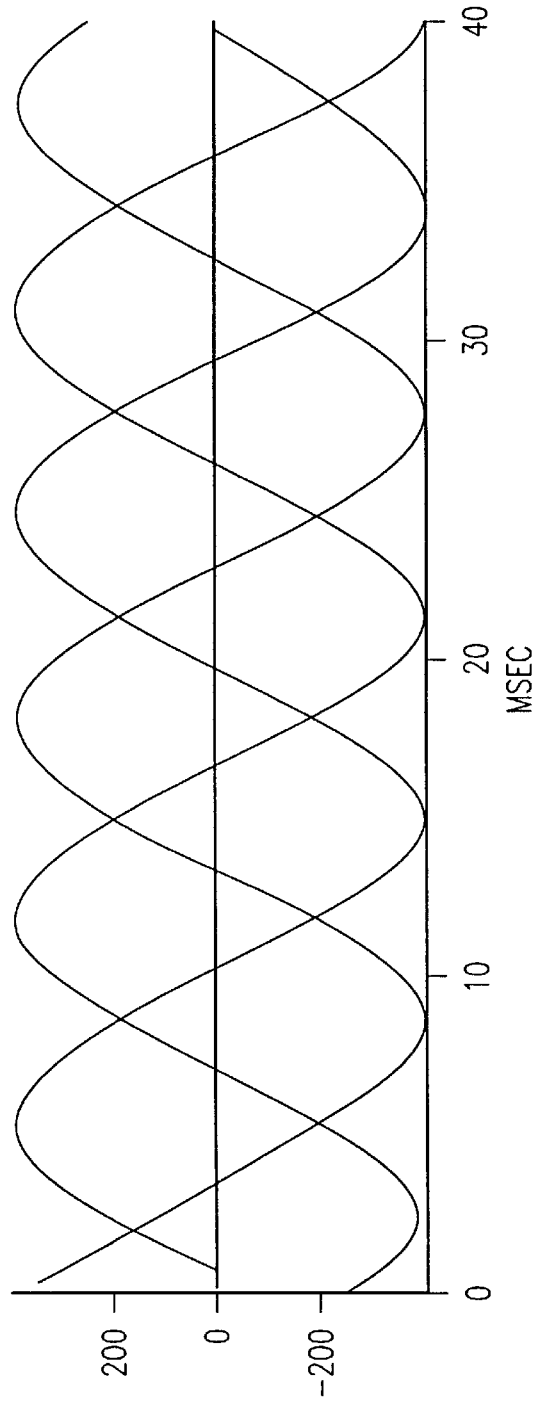

Operating at a converter frequency that is high in comparison to either the input or the reconstructed output phase frequency, small low-pass input/output filters smoothes the waveform of the converter's intermittent charging process. FIG. 13 shows both the three-phase currents and voltages with a simple L-C input filter at a converter frequency of 1800 Hz. The filter components were selected to permit the drawing of limited input power such that the ripple current is significantly below that recommended by the IEEE 519 and IEC 555-2 guidelines.

As illustrated, the normal operating conditions are obtained in less than a quarter of an input cycle. The current is sinusoidal with the exception of a low-level ripple at the converter frequency.

The input current is not only sinusoidal but also nearly in phase with the input voltage, yielding nearly a unity input power factor. There is only a slight phase-shift introduced by the input filter section. As will be discussed in a later section, the input current waveform can be modified, and, in an operation slightly more complex to control, the converter draw both controlled real and reactive power components.

Figure 14:
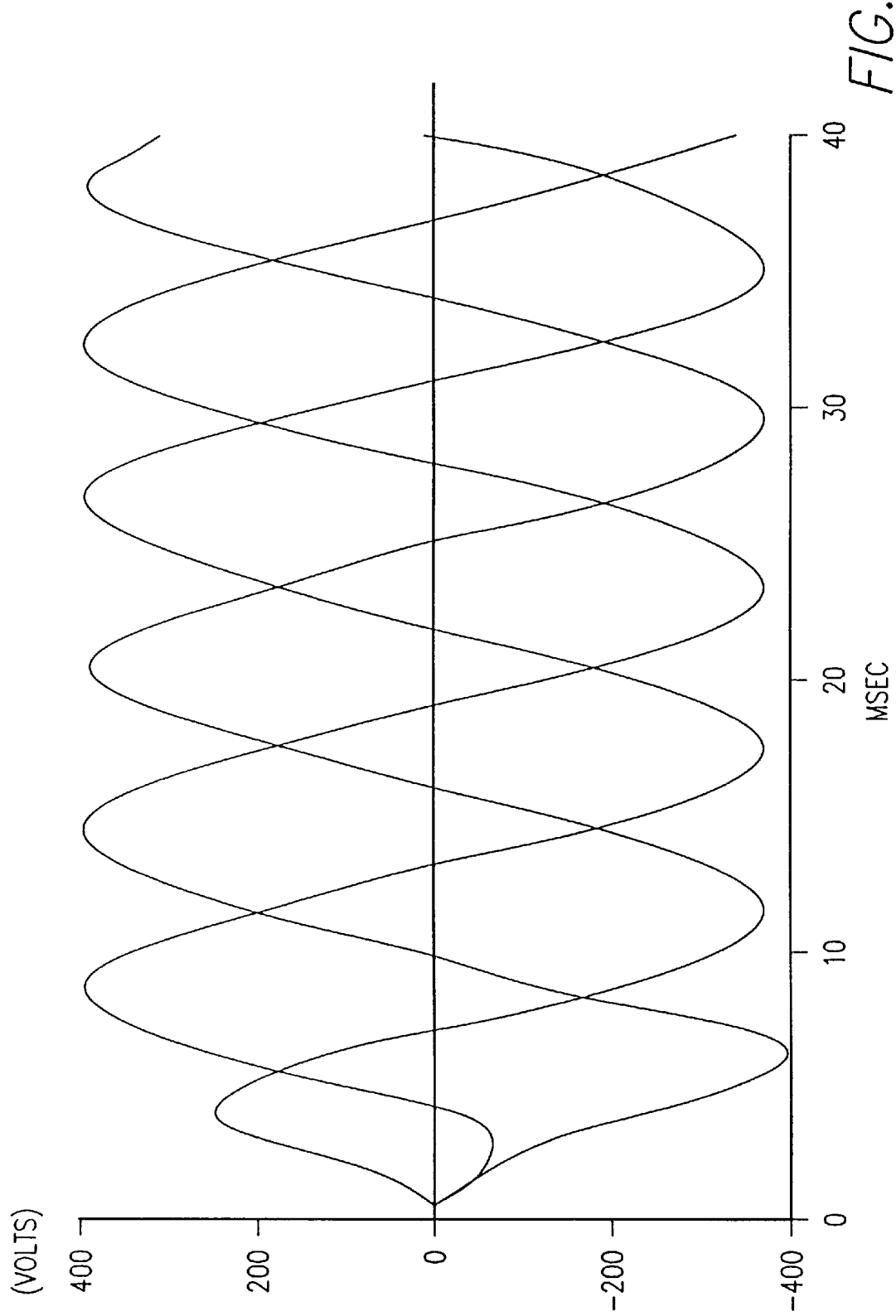
FIG. 14 is a graph of the output voltage over several AC cycles of the power converter shown in FIG. 11.

A low-pass "pi" filter was selected as the output filter. It has greater attenuation than the LC input filter, but requires two filter capacitors for each phase. FIG. 14 shows the output terminal voltage at a reconstruction frequency for the input condition shown in FIG. 13. The voltage waveforms and the current waveforms are nearly identical. There is a recognizable harmonic content in the output phase voltages. The output load, such as a motor, would see clean terminal voltages, as if produced by a rotating generator. This is relatively important, because standard motors now in service would not need to be replaced with a special motor to work in conjunction with a variable speed drive.

b. Bi-directional Power Flow with Residual Voltage Control

Most physical processes in nature are reversible as long as the energy losses are negligible. This is also the case with this type of converter. Referring to FIG. 11, the charging of the three capacitors C1, C2, and C3 can be performed off of the phase voltage terminal on the right by triggering the three forward-biased thyristors. The inductor Lox and capacitor Cx form a resonant circuit, charging the capacitor to twice the line terminal voltage. This is the inverse of the discharge cycle described above. The only components that are not used are the free-wheeling switches. Because the power flow is in the opposite direction, it is obvious that for the output phase angle the switches are used which were idle at the same phase angle and power flow in the opposite operating direction. The capacitors will be charged to the same polarity as in the input phase. This charge will reflect the voltage of the electric phase angle on the left AC terminal.

To discharge these capacitors, use the inverse process. Referring to FIG. 12 and Table 2, connect the highest positively charged capacitor C2 onto the lower inductor Lin by triggering Sc2n, and the negative capacitor C3 onto the upper inductor Lip by triggering Sc3p. At the same time, trigger Si1n and Si2p to deposit the energy into the positive phase 1 and negative phase 2, assuming the same left side phase angle of 80 degrees. As soon as the energy deposited into phase 2 reaches its predetermined value, Si3p is triggered to connect the negative phase 3 and back-bias Si2p. Shortly after the voltage of capacitor C2 becomes zero and the second positive capacitor connects through the switch Sc1n, the discharge continues and, because we started with a balanced line, the voltages of both capacitors become zero simultaneously. With additional energy in the two inductors, switch Swa coupled across Lip and Lin is triggered. This will connect the two inductor sections and prevent the capacitors from being partly recharged. As the current becomes zero, this switch will commutate off and the next capacitor charge cycle can be initiated.

To increase the power throughput, the voltage on capacitor C2 is recharged to a negative voltage, such as 30% of its input phase voltage. In addition, the triggering of switch Swa is delayed, such that the capacitor voltages on C1 and C3 also become reverse charged to the same percentage of their input voltage. This residual voltage will be the initial voltage for the next charge cycle and will increase the input charge energy. As was shown previously, this residual voltage control will permit the regulation of throughput power at a given inverter frequency ratio. In addition, power may be transferred from a lower voltage three-phase system to a higher three-phase system.

Figure 15:
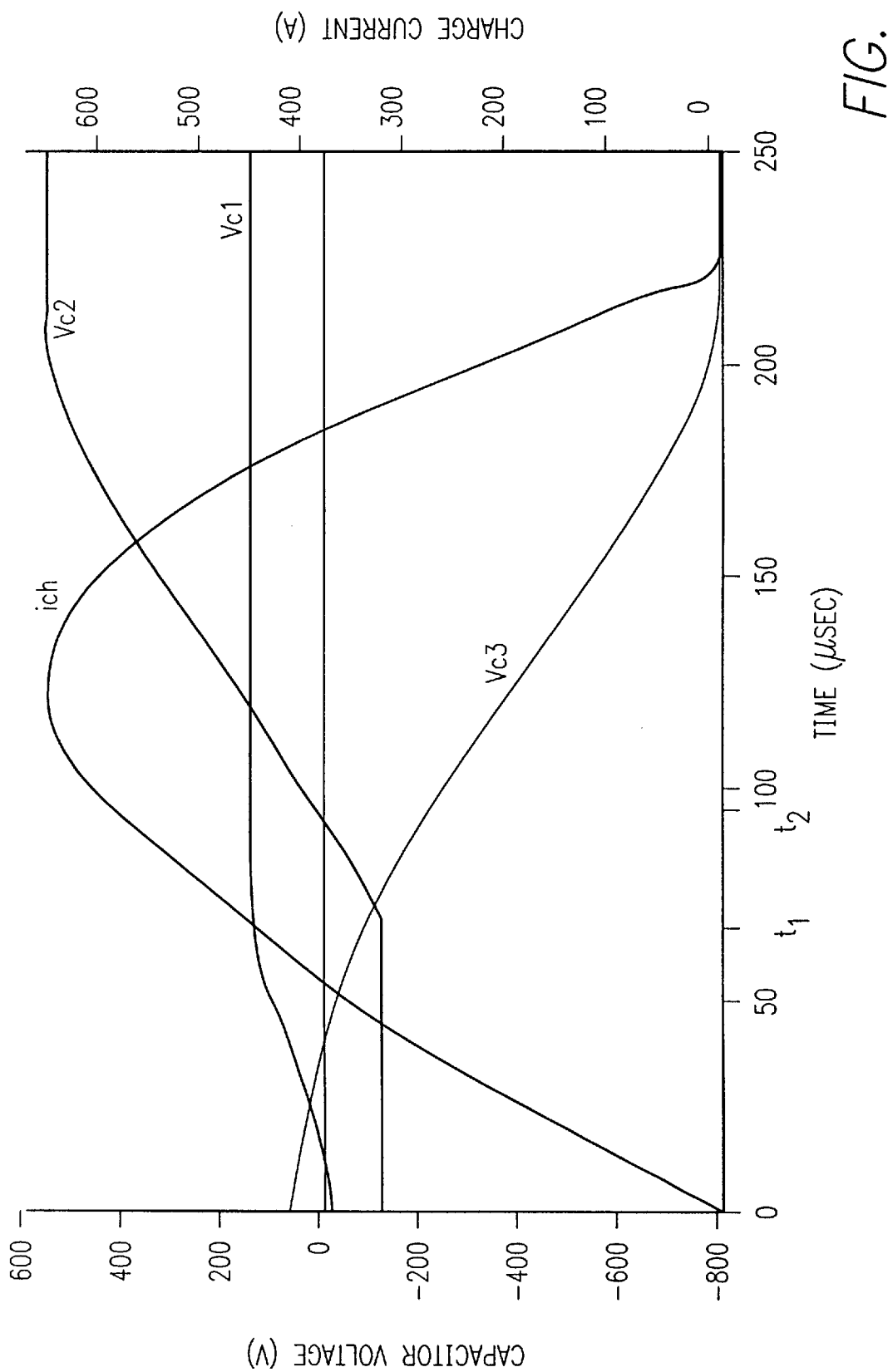
FIG. 15 shows the capacitor voltages and charge currents for the power converter with three capacitors, shown in FIG. 11, for a typical charging process with a residual voltage in the capacitors.

FIG. 15 shows, for the same input phase angle of 80 degrees and output phase angle of 170 degrees, the capacitor voltages and charge current. This result should be compared with the condition of no residual voltage at the same phase angles, as shown in FIG. 12. The timing is identical and the energy extracted from the input terminal is increased by 30%. The higher capacitor voltage permits the energy to be transferred to a higher output terminal. Having selected the inverter components, the maximum frequency is defined and the power throughput will be at a maximum. However, implementing the residual voltage control will permit boosting the output. The boost factor is only limited by the voltage and current limitations of the selected components.

In case the voltage droops on the input by 50%, the boost mode of operation permits the maintenance of the output voltage and power, with limited stress on the electrical components.

In summary, the inverter may be operated in either direction, with the addition of a free-wheeling switch. Residual voltage control permits the transfer of regulated power from a low voltage terminal to a higher voltage terminal. It follows that this configuration may be used for variable speed motors providing full-power dynamic braking.

c. Multi-port Operation

This power converter has a central part consisting of the three capacitors C1, C2, and C3. To the left, an input/output port is connected to the three capacitors using a partly sequential process. This circuit will be referred to as a Sequential Port (SP). It includes the low-pass filtering section. On the right side is the Parallel Port (PP) section because either the charging or discharging of all the capacitors is performed preferentially simultaneously. One can connect to the capacitors several SP or PP ports. This would permit one to connect several power sources as well as loads to the same common point. Power can be selectively controlled from any SP to PP or PP to SP, making this a multi-port inverter. No wave-form can be reconstructed at a PP from a PP power source, unless the input and output are in phase. This control can be of interest for several practical applications, such as an UPS.

XII. Alternate Electrical Configuration

Figure 16:
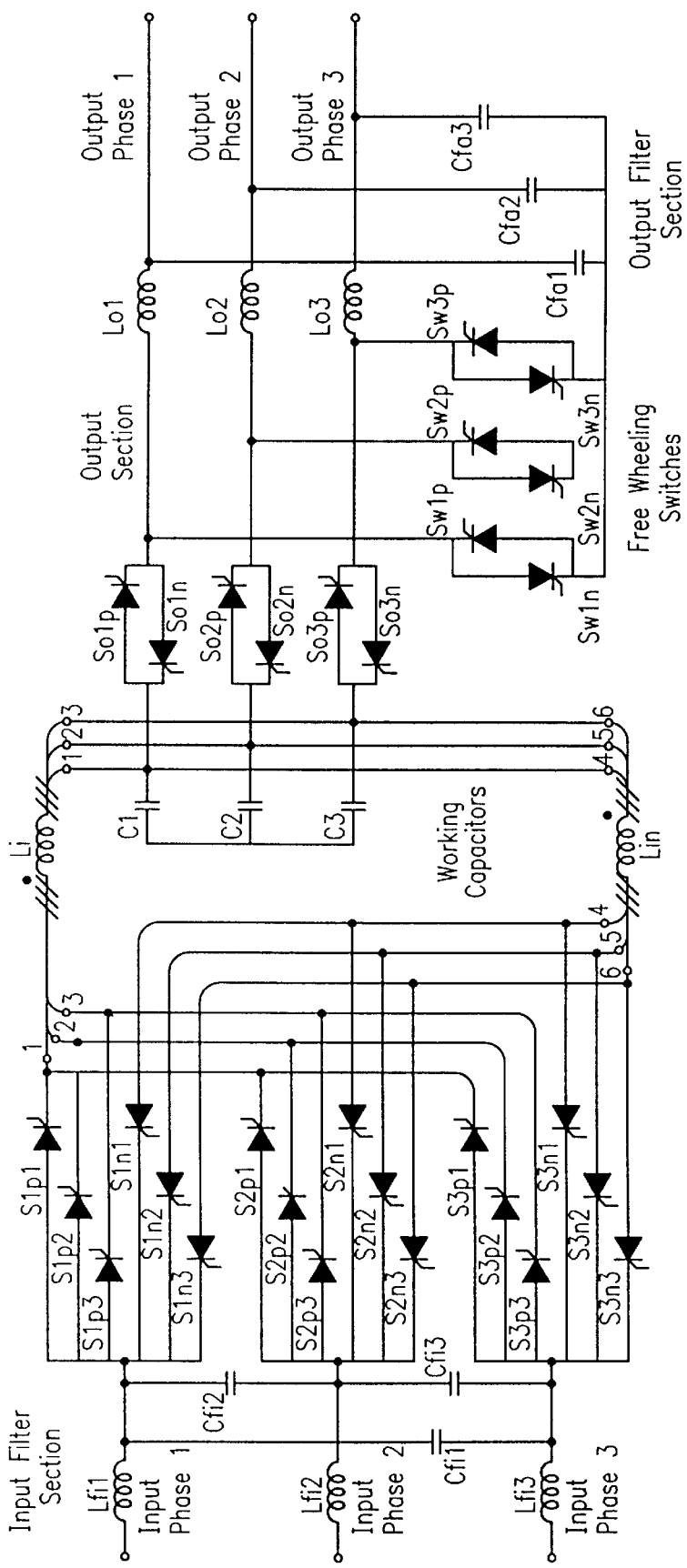
FIG. 16 is an electrical schematic of still another embodiment of a power converter with three capacitors.

Another embodiment of an AC-to-AC power converter is shown in FIG. 16. Its advantage over the AC-to-AC power converter shown in FIG. 11 is reduced switch losses.

With the power converter of FIG. 11, both the positive current and the negative current must pass through two thyristors for the charge cycle. Because a standard thyristor has a forward voltage drop of 1.6 V, the typical thyristor losses are on the order of 4.8 V. This results in thyristor losses of 1.5% for a 480 V AC-to-AC power converter. The embodiment shown in FIG. 16 reduces the charging losses by one half because the current passes through only one, instead of two, thyristor. This increased efficiency reduces the thyristor losses from 1.5% to 1.0%. For a 100 kW converter, these reduced losses constitute 500 watts of power. Using a present value of $10/watt, savings of $5,000 can be realized for equipment operating over 20 years.

Comparing the embodiment of FIG. 11 with the embodiment of FIG. 16 indicates that the cost should go up because the number of thyristors has increased from 12 to 18. However, the number of thyristors is misleading. The size of the thyristors is also a function of thyristor surface area. Because a thyristor is limited to a power dissipation of 80 watt/cm$^2$, it follows that for this configuration, the input thyristor area requirement decreases from 13 cm$^2$ to 6.5 cm$^2$. The six additional trigger systems will increase the cost; however, because the size of the thyristor assembly does not increase, the total equipment cost will be similar.

With the exception of the reduced losses, the embodiment of FIG. 16 is similar in operation to the circuit described in reference to FIG. 11. For the same input and output phase angles, the operation starts by connecting the positive input phase 1 to capacitor C1 and the negative input phase 3 to capacitor C3 by triggering the thyristors S1p1 and S3n3. At $t_1=66$ μsec, the capacitor C1 is charged to the required voltage and C2 is connected to the positive input phase 1 by triggering thyristor S1p2. At $t_2=93$ μsec, the required energy from phase 3 has been extracted. Thus, S2n3 is triggered to couple the negative input phase 2 to the capacitor C3.

Another difference from the circuit of FIG. 11 is the use of two coupled inductors Li and Lin with three closely coupled windings per inductor. During the charge cycle, only the wire (6) in the lower Lin is used, while on the upper inductor a switch is made from wire (1) to wire (2) at $t_1$. S1p1 will be forced off because of the coupling inductance in the wire (1) with the wire input voltage (2).

The total current through the upper or lower charging inductor has not changed for the two configurations and the inductor weight is little impacted.

A change to the output of this power converter was made by eliminating the filter inductor and second filter capacitor. This output filter configuration is cost effective for variable speed drives by utilizing in part the inductance of the motor as the filter. It is through the elimination of part of the filter that we will have a voltage ripple at the fundamental inverter frequency with a depth of modulation of about 15%; however, this is an order of magnitude less than for an PWM inverter and several orders less in dV/dt and therefore yields satisfactory performance as a variable speed drive.

The discharge operation is similar to that described in reference to FIG. 11. This inverter can also be operated in the opposite direction, however, additional free-wheeling switches will be needed.

XIII. Real and Reactive Power Flow Control a. Introduction

The energy into the working capacitor of the parallel port (PP) section, as described in a previous section, can be either increased or decreased by controlling the residual capacitor voltage. The same applies for the sequential port section. Because the parallel port section can be operated as both the input and output section, the real and reactive power flow control of the parallel port section will be described as both an input and an output port. This theoretical implementation will describe not only the flexibility of the circuit but also the specific technique required to meet the real and reactive power flow control requirements for real loads, such as induction motors. The following description will begin with the real power flow control assuming that the parallel port section is connected to a three-terminal AC power source. However, because the PP is bi-directional, this control applies for the SP output section as well.

After the real power flow control discharge cycle, the residual voltage is in phase or out of phase by 180 degrees with the voltage on the three-phase system. A residual voltage distribution different than that of the phase angle will draw reactive power.

b. Real Power Flow Control Using Initial Voltage Control

We start out with the input voltage on the first phase given by Equation (21) and the input current given by Equation (22).

$$V_A = V_o \sin(\omega t) \quad (21)$$

$$I(t) = I \sin(\omega t) \quad (22)$$

Let $I=I_o(1+\gamma)$, where $I_o$ is the current amplitude and where γ is the parameter that describes the amount of residual capacitor voltage. With the initial voltage of the capacitor at zero, it follows that the required current is obtained with the control of the inverter frequency as given by Equation 23.

$$I_o = 2CfV_o. \quad (23)$$

Equation (22) becomes $$I(t) = I_o(1+\gamma)\sin(\omega t) \quad (24)$$

$$I(t) = 2V_o Cf(1+\gamma)\sin(\omega t). \quad (24a)$$

The value γ defines the initial capacitor voltage in terms of the input voltage as given by Equation (25). It applies for all the input phases.

$$V_i(\omega t) = -\gamma V_A \sin(\omega t) \quad (25)$$

The power throughput is then given, $$P(t) = I(t)V_{in}(t) = 2Cf(1+\gamma)V_o^2 \sin^2(\omega t) = P_o(t)(1+\gamma). \quad (26)$$

According to equations (25) and (26), power throughput can be controlled by regulating the initial voltage on the capacitor without changing the inverter frequency $f$. The same applies for the other two phases such that the total throughput is independent of time. Of importance is that the output can be varied over a large range. For increased power operation the value of γ is positive, yielding a boost of power and requiring, according to Equation (25), a negative residual voltage. For reduced power operation a negative γ value is required. This reduces the throughput power, in accordance with Equation (26) and requires a residual voltage of the same polarity as the input voltage. As γ becomes −1, the residual voltage becomes identical to the input voltage and no power flows. It follows that for the range of −1<γ<0, the throughput power can be regulated at an inverter frequency limited by the operating conditions that will restrict the output harmonics to a selected value. On the other end of the power range, where we operate at the maximum inverter frequency, γ>0, we operate in the power boost mode and can increase the power output. This boost mode is also used to transfer power from a lower voltage terminal to a higher voltage terminal.

c. Combined Real and Reactive Power Flow Control

In a previous section, the buck and boost modes were described with γ<0 and γ>0, respectively. If we define the γ value by $\gamma = r \cos(\beta)$, the boost mode residual voltage condition can be defined as γ=−r, with β=π and $r=V_i/V_o$, while the buck mode is given as γ=r, with β=0.

The β value of zero and π results in real power flow control with the reactive power being zero. The value β is the phase angle between the initial and the input voltages. Since we can control the phase angle during the redistribution, we have the option of redistributing the total residual energy for any phase angle.

The residual voltage in the three capacitors can be defined as, $$E_r = 3CV_r^2 = 3CV_o^2 r^2. \quad (27)$$

The initial voltage of the first phase can be given as, $$V_A(t) = V_o r \sin(\omega t + \beta). \quad (28)$$

The charge interchange between the capacitor and the input terminal is then given by $$\Delta Q = C(V_f - V_i) = 2CV_o(\sin(\omega t) - r \sin(\omega t + \beta)). \quad (29)$$

Multiplying the second term by the inverter frequency f, we obtain the average line current of, $$I(t)=2CV_o f((1-r\cos(\beta))\sin(\omega t)-r\sin(\beta)\cos(\omega t)). \quad (30)$$

We recognize that the first current term is in phase with the input voltage and is now both a function of the residual voltage ratio r and phase angle β. The second term is out of phase with the input voltage and represents the reactive current. It is directly proportional to the residual voltage. At a phase angle of zero and π, the reactive power is zero, and we get boost mode and buck mode operations, respectively.

Multiplying the current by the voltage and adding together all three terms, we obtain the real power flow of, $$P(r,\beta)=3VCV_o^2 f(1-r\cos(\beta)). \quad (31)$$

This reduces the power flow of buck mode with β=0 and the power flow of boost mode for β=π.

From Equations 30 and 31, we also obtain that the real current and real power terms become zero when, $$\beta=\cos^{-1}(1-r). \quad (32)$$

Since the second current term is not zero, it follows that we draw only reactive power and that the total energy in all three capacitors does not change. This yields the operation of a static VAR compensator.

The reactive power term per phase is given by, $$Q_f=-2CV_o^2 f(2\sin(\beta)\sin\sin(\omega t)\cos(\omega t)). \quad (33)$$

Figure 17:
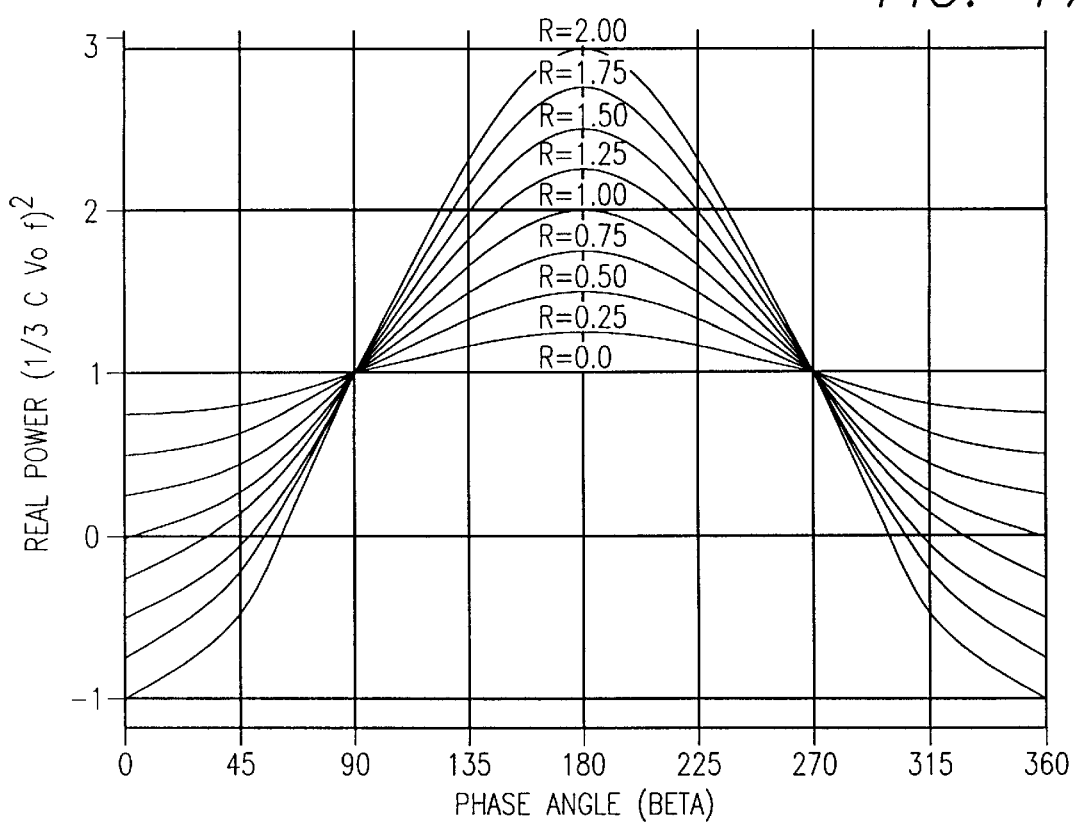
FIG. 17 is a graph of a set of parametric operating curves of the real power flow as a function of the residual voltage phase angle for the power converter with three capacitors shown in FIGS. 11 and 16.

In addition, this control and performance is obtained without the production of harmonics. FIG. 17 shows the real power flow as a function of a range of r from 0 to 2.0. A negative power flow constitutes a reversal of the power. It permits bi-directional power flow control. We see that for a phase angle of zero the power can be controlled fully with a residual voltage ratio from zero to one. As the residual r becomes larger, the power flow is in the reverse direction. At a phase angle of 180 degrees, the output can theoretically be boosted to any value.

Figure 18:
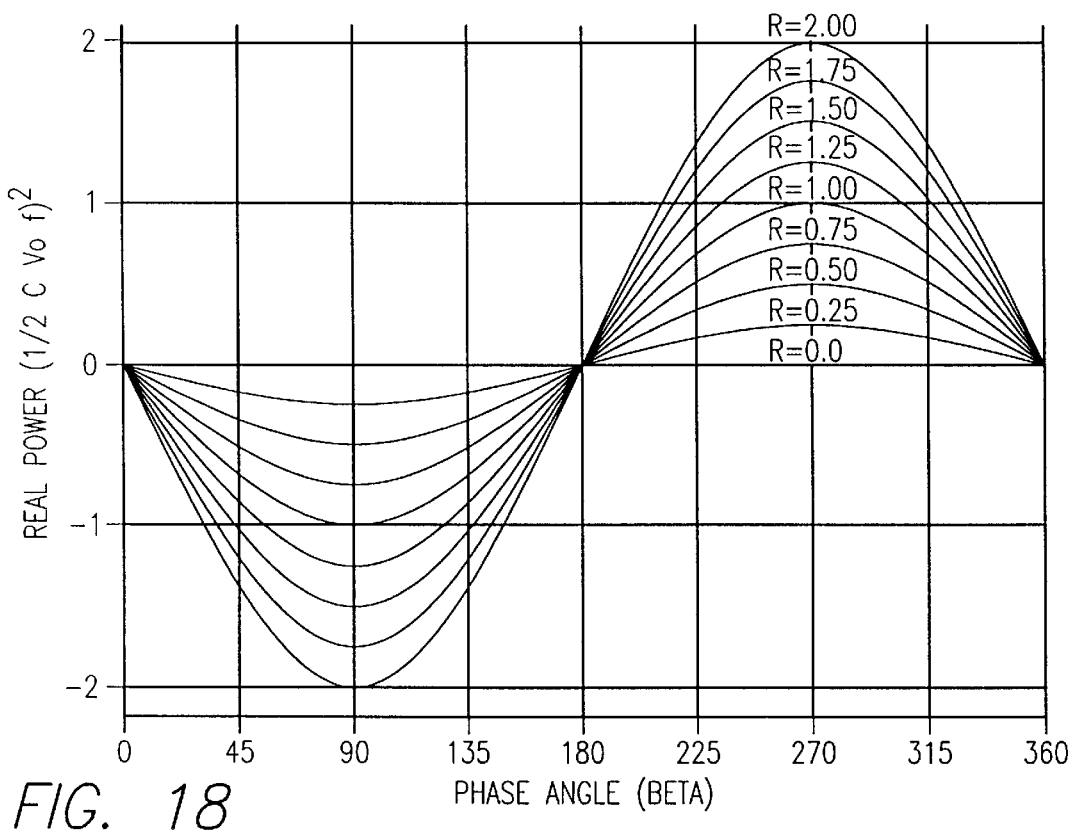
FIG. 18 is a graph of a set of parametric operating curves of the reactive power flow as a function of the residual voltage phase angle for the power converter with three capacitors shown in FIGS. 11 and 16.

FIG. 18 shows the reactive power flow as a function of the phase angle. With the same residual energy we can jump from full leading to full lagging reactive power control by the selection of the redistribution angle β. The question is why it is important to control the reactive power. One of the important reasons is that with a spinning induction machine, such as a generator or flywheel motor, that might require instantaneous power output, building up the voltage and reaching full power will take a long time. However, if we inject reactive power into this machine in anticipation of drawing high power, full output power can be drawn instantaneously. If no reactive power is flowing in the windings of that machine, we have the option of using power from another source, such as a battery, to build up the reactive power in a few cycles and, with it, gain the capability of obtaining a fast ramp-up of the real output power from an induction generator.

Figure 19:
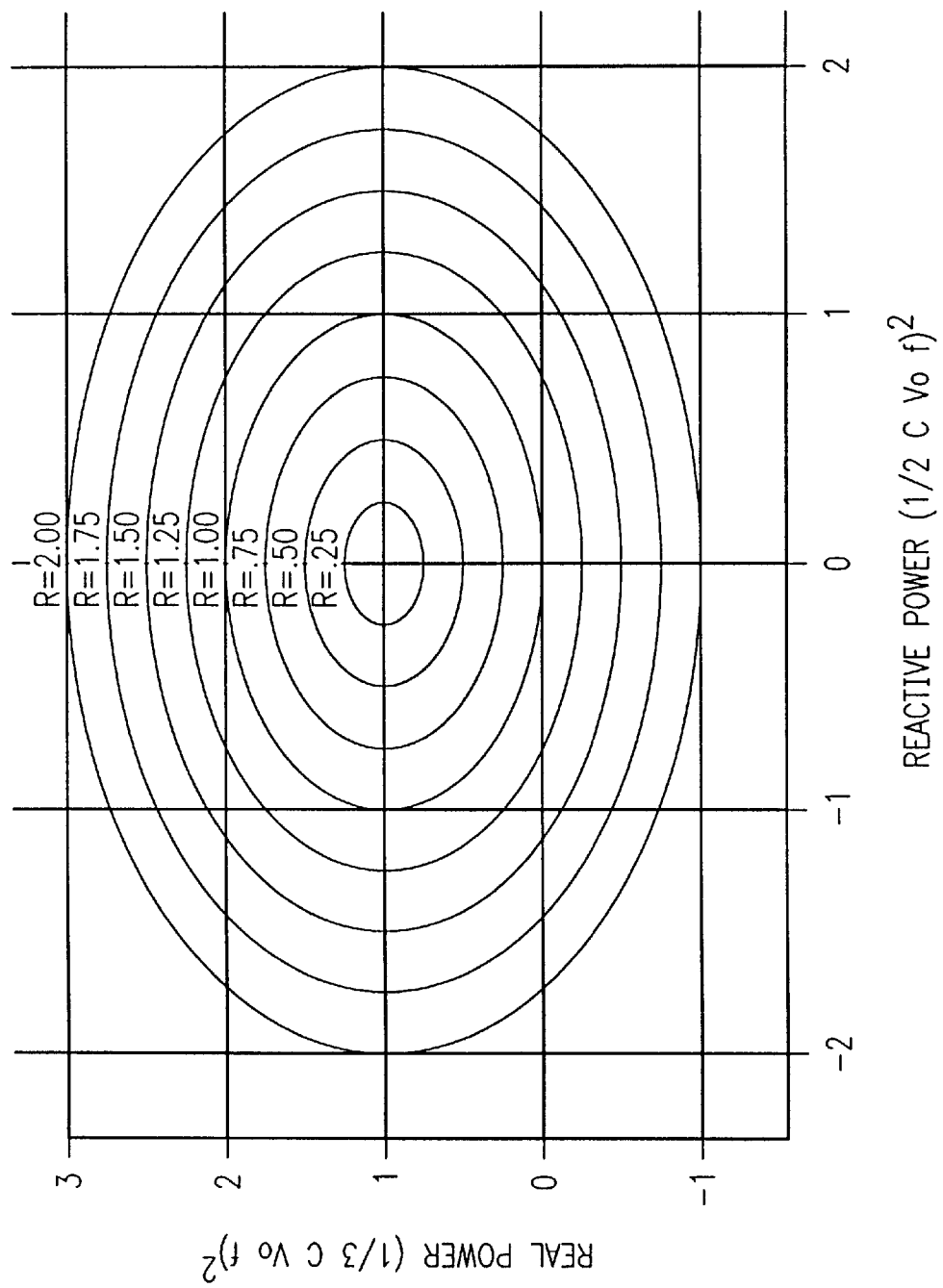
FIG. 19 is a graph of a set of parametric operating curves for the input power flow control given the reactive power as a function of the real power flow angle for the power converter with three capacitors shown in FIGS. 11 and 16.

Because both the phase angle and the residual/initial voltage ratio r are the controlling factors for the real and reactive powers, the real power was plotted as a function of the reactive power in FIG. 19. As can be seen, we may obtain simultaneously any real and reactive power flow control with the selection of the appropriate r and β values. The point (0,1), where r=0, represents the normal mode of operation, where the power throughput is controlled with the inverter frequency. Moving straight up represents the boost mode operation with β=π. Moving down represents the buck mode operation with β=0. Moving along the x-axis, we get the condition of reactive power flow control only. This corresponds to the solution of Equation 33. FIG. 19 gives the input power flow control for the desired input power drawn from either a generator or any other multi-terminal system. The parameter r and phase angle β correspond to the voltage and phase configuration on the internal inverter capacitors. This permits the continuous control of the desired throughput power as dictated by the load and also permits the simultaneous drawing of reactive power from the generator to obtain the optimum operating conditions. The operator of an electric power plant has the option of setting the generator's excitation voltage to match the generator phase angle and supplying the reactive power demand of the grid. This is not the case for an induction generator, with which it is desirable to match the load to the generator for optimum performance because an induction generator has no adjustability. In this mode of operation, the input end of the converter is also operated as a controllable VAR generator.

Figure 20:
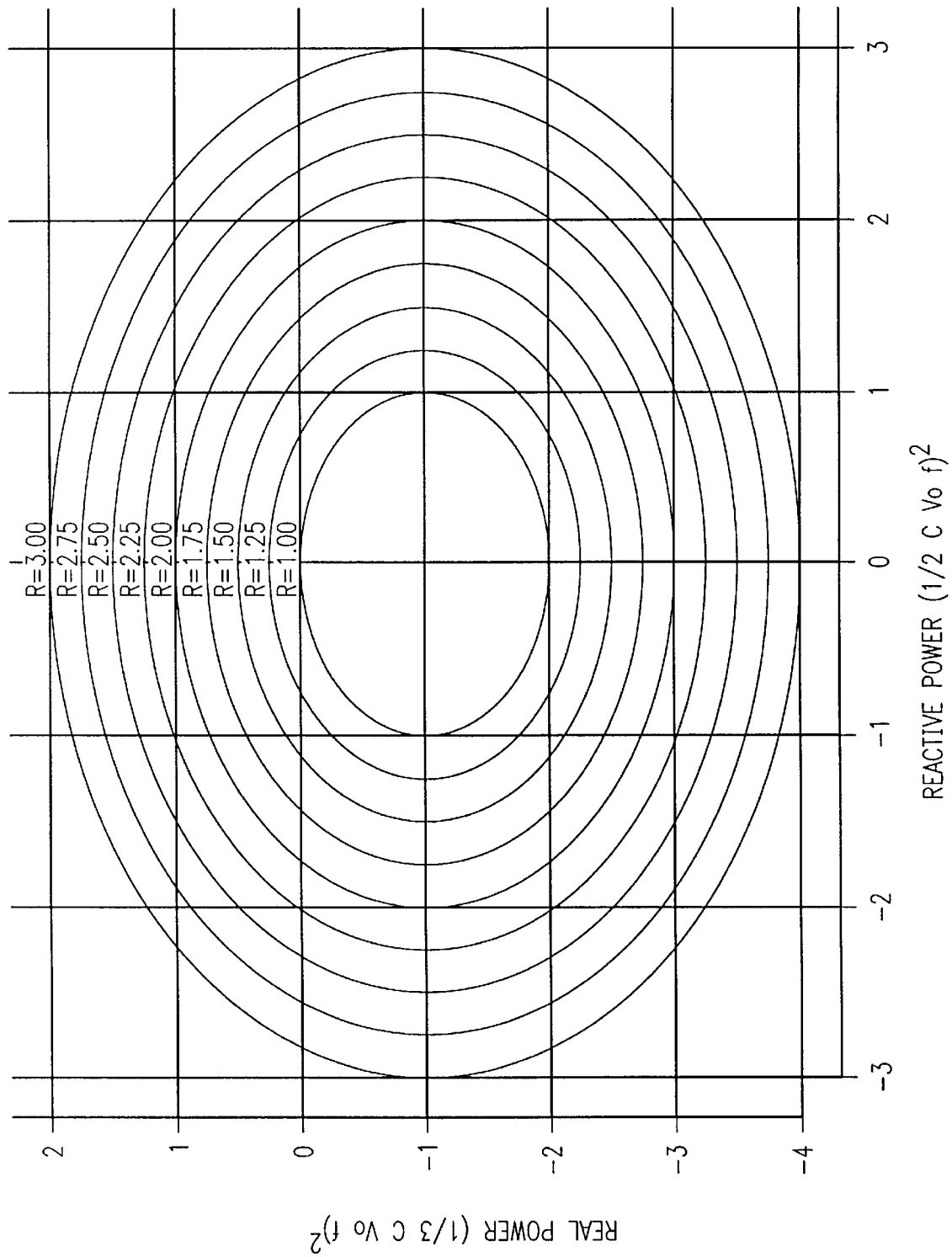
FIG. 20 is a graph of a set of parametric operating curves for the output power flow control given the reactive power as a function of the real power flow angle for the power converter with three capacitors shown in FIGS. 11 and 16.

The output end of an AC-to-AC power converter or a DC-to-AC inverter operates similarly to the input of the AC-to-AC power converter or the input of the AC-to-DC converter. The same dynamics apply, but the capacitor voltage has to be higher than the output line voltage in order to facilitate a positive power transfer. If we let r equal the initial capacitor voltage, normalized to the output line voltage, we obtain a similar plot. We also define angle α to be the angle between the output phase angle and the capacitor distribution angle and can then generate a real and reactive power transfer plot. FIG. 20 shows the plot of the real and reactive power transfer for various initial values of R. Only the part of the plot where the real power flow is positive is of interest; however, the other part is also applicable for bi-directional flow. This is the same plot as FIG. 19, flipped around the x-axis.

On the positive y-axis, with the phase angle α zero and no power is transferred for R=1. At R=2 and α=0, full power is transferred with all the energy being discharged. As one increases the capacitor voltage, the transfer increases linearly while the stored energy increases as the square of the voltage, or V. The difference in the energy remains as residual voltage on the capacitor and may be used as the initial condition of the next charge cycle. For r>2 the residual voltage in the capacitors will be the opposite of the initial voltage. For 1>r>2 full capacitor energy transfer is not energetically possible and the residual voltage will have the same polarity as the initial voltage. This residual voltage can be instrumental in drawing additional energy on the next charge cycle, yielding a higher voltage to permit an increased power transfer.

The operation for real power >1 can be modified with the use of the free-wheeling operation. As the capacitor voltage reaches zero or at any later time, the recharging of the capacitor can be prevented or stopped, and the energy in the output inductor can be completely transferred to the output terminal. By triggering at the correct time, we can select a residual voltage and initial energy for the next scheduled charge cycle. This gives us the desired throughput power control and input reactive power control capabilities.

Since very few loads are purely resistive, it is practical to deliver both real and reactive power by redistributing the total energy remaining from the previously charged cycle with a specified angle α. This angle corresponds to the angle measured with respect to the positive y-axis and increases in the counter clockwise direction. As the angle increases, the reactive power increases while the real power throughput decreases. There are two points where the real power is zero and the inverter will produce only reactive power with either leading or lagging phase angles. The operation of both the charge cycle and discharge cycle needs to be coordinated. The control of the operation can be performed with real time control. However, the necessary computation can be significantly reduced by using precalculated reference tables. The optimum control architecture is subject to the selection of the control algorithm, computer, and the complexity of the selected operating requirements.

XIV. DSCI Operation with Other Circuit Topology

The RCTA and DSCI method is versatile and can be used with a number of energy storage devices, as shown in FIG. 11, or with a transformer, as shown in FIGS. 9 and 10. The RCTA and DSCI method can be utilized as a part of the input or output of such hybrid circuits. In fact, the RCTA and DSCI method can be the charging source of any transmission line or pulse forming circuit. Similarly, the RCTA and DSCI method can be used in conjunction with a number of voltage multipliers/dividers, charging such devices either directly or through magnetically coupled devices. The energy storage device can be a single capacitor as in FIG. 1, in the series coupled configuration of FIG. 10, or can consist of a number of capacitors integrated with other passive and active electric or electronic devices.

The attractive feature of the DSCI topology that it can be combined with many of the voltage multiplication circuits. While the voltage multiplier circuit significantly distorted the AC input waveform, the RCTA draws harmonic free power at unity or selected power factor. In addition the DSCI circuit delivers the power to the multiplication circuit at a much higher frequency and therefore utilizes many more the electrical multiplier circuit components, thus reducing the weight and volume requirements of such a circuit for a given power level. The combination of the harmonic free power input and high components utilization makes the DSCI modified voltage multiplier applicable for higher power applications.

Of particular practical importance is the integration of the DSCI circuit topology with circuits as described in issued or patent-pending Limpaecher patents. The DSCI may be part of the charging or discharging operation in these circuits. It may also be used as part of the intermediate device cycle operation.

As opposed to devices using the DSCI circuit topology, which require the triggering of solid state switches, this technology is relatively advanced and a nearly unlimited combination of analog, digital, or hybrid control circuit topology may be selected. For most applications it is desirable to monitor the input, output, and detailed circuit operation status to optimize the performance and take corrective action if a fault occurs. Additional communication is desirable to permit remote control operational status reporting.

XV. Commutation Control

Figure 21:
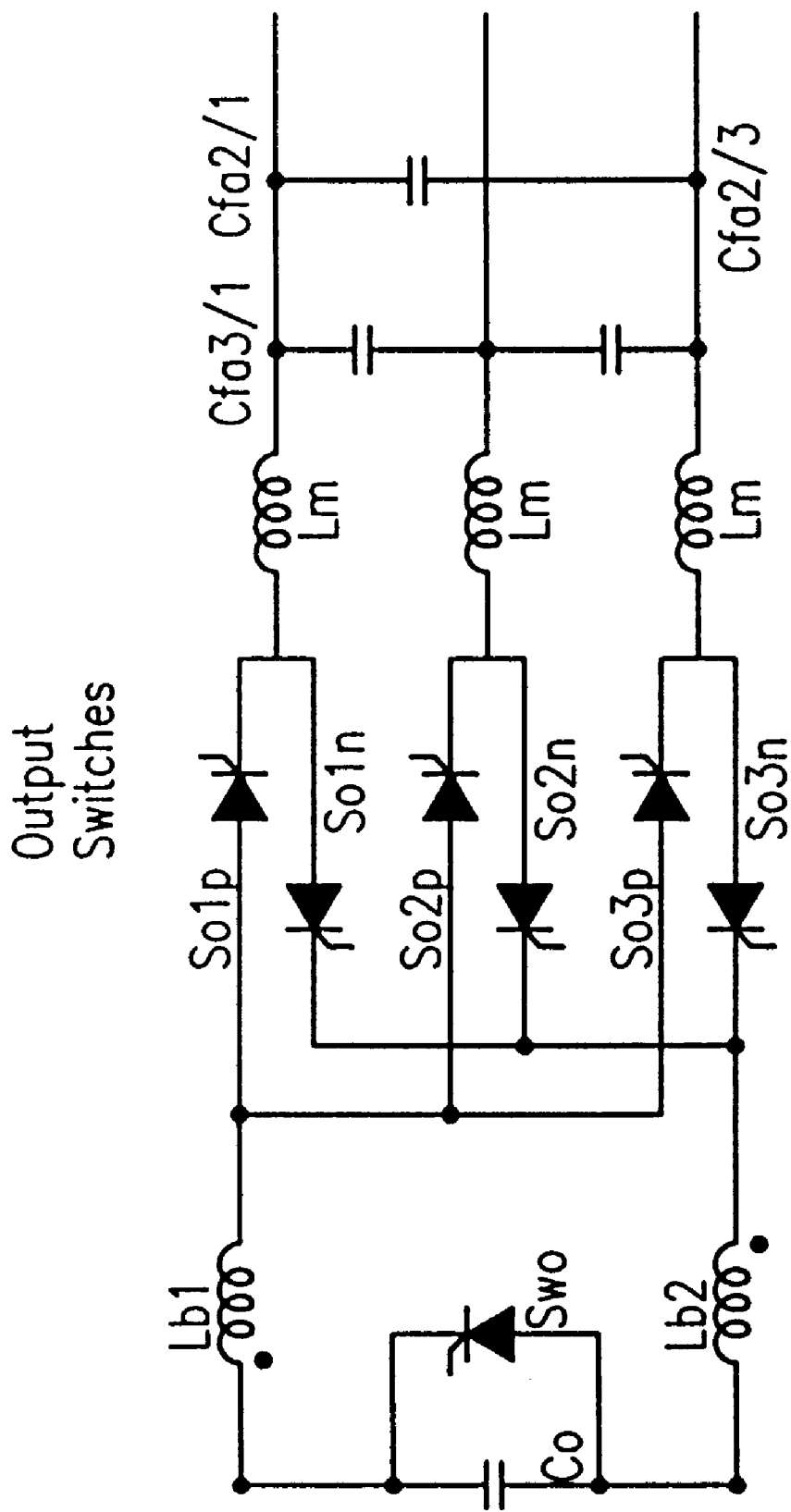
FIG. 21 is an electrical schematic of the basic architecture of a power converter output section with the addition of commutation inductors to reduce the current rate of change of the commutation switches.

For both the three-phase charge and discharge cycle of the circuit shown in FIG. 1, only one thyristor will have a complete half of a sine wave. The maximum dI/dt is at the beginning or end of the half sine wave and is given $\omega Io$. For a maximum current amplitude of Io of 1 kA and a 250 $\mu$sec resonant charging period the dI/dt=12.6 A/$\mu$sec. This is well within the thyristors with a maximum dI/dt of 500 A/$\mu$sec, with a recommended repetitive dI/dt of 200 A/$\mu$sec. The currents of the other two conducting thyristors are a fraction of the same sine wave, and the current traces of FIG. 8 shows the transfer of the conduction from one thyristor to the other instantaneously at $t'_1$. This yields a high turn-on and turn-off dI/dt that could damage the thyristors and increase the thyristor losses. We have experimentally controlled the thyristor commutation in the AC-to-DC and DC-to-AC conversion by installing commutation inductors Lm as shown in FIG. 21.

For each output phase, a small commutation inductor Lm is installed between the thyristor assembly and the output filter capacitors. These inductors are typically of the order of 20% of the output inductor Lb and two of them are part of the resonant discharge circuit at all times. With these inductors installed, the commutation dI/dt is given by $\Delta V/(2\ Lm)$, where $\Delta V$ is the voltage difference between the two voltages on the output capacitors involved in the commutation process. The control system needs to take the commutation time into consideration and trigger the last thyristor one-half of the commutation period earlier. The pretrigger time is simply tpr=Lm * Idc/$\Delta V$, where Idc is the discharge current at the commutation time. Using this approach requires small inductors that easily limited the dI/dt to 50 A/$\mu$sec.

The dI/dt of the free-wheeling thyristor can be limited as well by connecting a small inductor in series. With the free-wheeling current usually a fraction of the full amplitude, this commutation inductor can be smaller. In addition, it is preferable to select a thyristor dI/dt closer to the maximum dI/dt of the repetitive pulsed thyristor specification to limit the voltage reversal of the capacitor Co. This dI/dt of the free-wheeling circuit inductance and the thyristor turn-off delay result in a given voltage reversal of the capacitor Co. This is not negligible, but constitutes no problem if these effects are taken into consideration by the control algorithm.

XVI. Control

To control the throughput, we have touched on the inverter frequency control and the residual voltage control. With the frequency control the throughput of power or current is increased by either increasing the rate of the energy or charge exchange that occurs per charge exchange cycle. Typically the energy per charge cycle divided by the interpulse duration, the time between consecutive discharge operations, yields the desired power throughput.

The residual voltage control on the other hand permits control of the amount of energy or charge exchange on the next charge interchange operation. It follows that the residual voltage control permits control of the charge energy per charge cycle such that the power throughput, at any inverter frequency, can be controlled by the residual voltage.

Both modes of operation may be combined to obtain the most flexible control capability. The control operation can be performed with solid state devices that are not opening switches and the operation can be classified as "soft switching", where both the turn-on and turn-off occurs at zero current. The soft switching operation typically reduces the switching loses, eliminates the snubbed requirement, and reduces the dI/dt requirement of the circuit and of the switches. This permits use of proven and highly developed thyristors with higher operating voltage, higher operating current ratings and lower loses; with a lower price tag and higher proven reliability than any switch either on the market or in development. Switches that have both closing and opening capability can be substituted for any switch operating in a circuit as a closing switch operational function. In fact there will be application where such switches may be desirable to obtain higher speed, additional control flexibility, or faster switch recovery.

The control is not limited to the frequency or residual voltage control. One skilled in the arts will appreciate that additional control can be obtained in any of the described circuits if the charge interchange operation is controlled directly with the input switches. With the control of the input energy or the amount of charge interchange, the power or current flow can be controlled as well. That kind of control would in most instances require the use of controlled opening switches and would not result in "soft switched" operation. However the additional control flexibility or other beneficial operation can result in the preferential selection of the additional input switch section control.

To control the operation a controller is required, which monitors the input and output terminals in addition to converter voltage and current condition, to correctly operate the switches. This control function can be either performed by, for example, analog circuitry, a digital controller, or a microprocessor. One preferential embodiment is to use a Programmable Logic Devices (PLDs) integrated with a digital lookup tables. These look-up tables can contain most of the critical timing that can be used by the PLD. The microprocessor can be used for monitoring the operation and measures the input and output analog parameters. Such a microprocessor can perform all computations for real time control, however most of the operation can be stored in the lookup table. The data in the lookup table may be in the form of a multi-dimensional table or in a form such as coefficient of a polynomial that can be used to generate the lookup table values.

The correct operation of the charge cycle depends only on the correct timing of a single switch. Once the charge cycle is complete, the processor can precisely determine error of that trigging event. Similarly for the discharge operation, the correct timing depends mainly on the third output switches triggered, in addition the correct residual voltage depends on the correct triggering of the free-wheeling switch. Once the discharge is completed the microprocessor can compute, on the basis of the measured charge transfer and residual capacitor voltage, the errors of the two switches operation. In practice the precise performance may be difficult to compute ahead of time and may change as the temperature effect of the passive power components and the delay and other parameters of the active switches changes. The microprocessor can monitor the performance and modify the stored lookup table to actively minimize the error for the changes in input, output, or internal converter operational condition on a continues basis, generating in real time a refined lookup table with much higher resolution than the one stored.

Although the invention is described with respect to a preferred embodiment, modifications thereto will be apparent to those skilled in the art. Therefore, the scope of the invention is to be determined by reference to the claims which follow.

What is claimed is:

1. A method of transferring electric charge between a charge storage device and a first power terminal having a plurality of first-nodes, said method comprising:
    interchanging charge between the charge storage device and a first first-node of the plurality of first-nodes through an inductive section;
    when a predetermined charge has been interchanged between the charge storage device and the first first-node, replacing the first first-nodes by a second first-node of the plurality of first-nodes; and
    interchanging charge between the charge storage device and the second first-node through the inductive section.

2. The method of claim 1, wherein a second power terminal having a plurality of second-nodes, the method further comprising:
    interchanging charge between the charge storage device and a first second-node of the plurality of second-nodes through the inductive section;
    when a predetermined charge has been interchanged between the charge storage device and the first second-node replacing the first second-node by a second second-node of the plurality of second-nodes; and
    interchanging charge between the charge storage device and the second second-node through the inductive section.

3. The method of claim 2 further comprising:
    configuring the first power terminal as an AC power terminal; and
    configuring the second power terminal as an AC power terminal.

4. The method of claim 2 further comprising:
    configuring the first power terminal as an AC power terminal; and
    configuring the second power terminal as a DC power terminal.

5. The method of claim 2 further comprising:
    configuring the first power terminal as a DC power terminal; and
    configuring the second power terminal as a DC power terminal.

6. The method of claim 2, wherein a plurality of power terminals including the first power terminal and the second power terminal, wherein:
    the charge interchange between the charge storage device and the first power terminal can be take place between any one of the plurality of power terminals and the charge storage device; and
    the charge interchange between the charge storage device and the second power terminal can be take place between any one of the plurality of power terminals and the charge storage device.

7. The method of claim 2, wherein the first power terminal and second power terminal are the same power terminal.

8. The method of claim 2, wherein alternating the charge interchange between the charge storage device and the first power terminal with the charge interchange between the charge storage device and the second power terminal.

9. The method of claim 2, wherein simultaneously interchanging charge between the charge storage device and the first power terminal and interchanging charge between the charge storage device and the second power terminal.

10. The method of claim 1, wherein the charge storage device comprises a plurality of capacitors.

11. The method of claim 1, wherein the charge storage device comprises a single capacitor.

12. The method of claim 1, wherein the inductive section comprises a plurality of inductors.

13. The method of claim 1, wherein the inductive section comprises a single inductor.

14. The method of claim 1, wherein the inductive section comprises the windings of a single-phase transformer.

15. The method of claim 1, wherein the ratio of the predetermined charge interchanged between the charge storage device and the first first-node and the charge interchanged between the charge storage device and the second first-node is equal to a ratio of the currents drawn from the first first-node and the second first-node.

16. The method of claim 2, wherein the ratio of the predetermined charge interchanged between the charge storage device and the first second-node and the charge interchanged between the charge storage device and the second second-node is equal to a ratio of the currents injected into the first second-node and the second second-node.

17. A charge transfer apparatus comprising:
an inductive section;
a charge storage device coupled with the inductive section to form a resonant circuit with the inductive section;
a first power terminal having a plurality of first nodes;
a plurality of first switches coupling the first power terminal with the resonant circuit; and
a control unit for controlling the operation of the plurality of first switches to interchange a first predetermined amount of charge between a first node of the plurality of first nodes and the energy storage element and to interchange a second predetermined amount of charge between a second node of the plurality of first nodes and the energy storage element, wherein the ratio of the first predetermined amount of charge interchanged between the charge storage device and the first node and the second predetermined amount of charge interchanged between the charge storage device and the second node is equal to a ratio of the currents drawn from the first node and the second node.

18. A charge transfer apparatus comprising:
an inductive section;
a charge storage device coupled with the inductive section to form a resonant circuit with the inductive section;
a first power terminal having a plurality of first nodes;
a plurality of first switches coupling the first power terminal with the resonant circuit;
a control unit for controlling the operation of the plurality of first switches to interchange a first predetermined amount of charge between a first node of the plurality of first nodes and the charge storage device and to interchange a second predetermined amount of charge between a second node of the plurality of first nodes and the charge storage device, wherein the ratio of the first predetermined amount of charge interchanged between the charge storage device and the first node and the second predetermined amount of charge interchanged between the charge storage device and the second node is equal to a ratio of the currents drawn from the first node and the second node;
a second power terminal having a plurality of second nodes; and
a plurality of second switches coupling the second power terminal and the resonant circuit;
the control unit for controlling the operation of the plurality of second switches to interchange a third predetermined amount of charge between a first second-node of the plurality of second nodes and the charge storage device and to interchange a fourth predetermined amount of charge between a second second-node of the plurality of second nodes and the charge storage device, wherein the ratio of the third predetermined amount of charge interchanged between the charge storage device and the first second-node and the fourth predetermined amount of charge interchanged between the charge storage device and the second second-node is equal to a ratio of the currents injected into the first node and the second node.

19. The charge transfer apparatus of claim 18, wherein the charge transferred from the first power terminal to the charge storage device is alternately followed by charge transferred from the charge storage device to the second power terminal.

20. The charge transfer apparatus of claim 18, wherein the first power terminal is configured to receive a multi-phase power supply and the second power terminal is configured to supply a multi-phase power load.

21. The charge transfer apparatus of claim 18, wherein the control unit operates the plurality of second switches to reconstruct an AC waveform on the second power terminal.

22. The charge transfer apparatus of claim 18, wherein the first power terminal is configured to receive a multi-phase AC power supply and the second power terminal is configured to supply a DC load.

23. The charge transfer apparatus of claim 18, wherein the first power terminal is configured to receive a DC power supply and the second power terminal is configured to supply a multi-phase AC power load.

24. The charge transfer apparatus of claim 18, wherein the first power terminal is configured to receive a DC power supply and the second power terminal is configured to supply a DC power load.

25. The charge transfer apparatus of claim 18, wherein the first power terminal is configured to receive a multi-phase AC power supply, and the control unit operates the plurality of second switches to produce an average current described in a Fourier series.

26. The charge transfer apparatus of claim 25, wherein one of the Fourier components is such that the averaged current is in phase with the voltage of the multi-phase AC power supply.

27. The charge transfer apparatus of claim 25, wherein one of the Fourier components is such that the averaged current is out of phase by 90 electrical degrees with the voltage of the multi-phase AC power supply.

28. The charge transfer apparatus of claim 25, wherein the Fourier component being a harmonic of the fundamental frequency of multi-phase AC power supply such that the averaged current yields a harmonic current flow component.

29. The charge transfer apparatus of claim 18, wherein the first power terminal and the second power terminal are the same and coupled to an AC grid, and the control unit operates the plurality of first switches and the plurality of second switches to control the reactive current of the AC grid.

30. The charge transfer apparatus of claim 18 further comprising a free-wheeling switch coupled across the charge storage device, wherein the control unit operates the free-wheeling switch to control the residual voltage of the charge storage device.

31. A charge transfer apparatus for directly transferring energy from an input terminal having a plurality of input nodes to an output terminal having a plurality of output nodes, said charge transfer apparatus comprising:
a plurality of input switches coupled with the input nodes;
a plurality of output switches coupled with the output nodes;
a charge storage device coupled in series between the plurality of input switches and the plurality of output switches;
an inductive section coupled in series with the charge storage device such that the inductive section and the charge storage device form a series resonant circuit; and
a control unit for operating the plurality of input switches and the plurality of output switches, wherein the control unit simultaneously turns on two input switches and two output switches to forming a connection between two input nodes and two output nodes with the inductive section and the charge storage device in series, and, when a predetermined charge has been extracted from a one of the two input nodes, the control unit turns on a third input switch, and, when sufficient charge has been injected into a one of the two output nodes, the control unit turns on a third output switch.

32. The charge transfer apparatus of claim 31 further comprising a free-wheeling switch coupled across the inductive section, wherein the control unit turns on the free-wheeling switch to cause residual energy in the inductive element to the transfer to the output terminal.

33. The charge transfer apparatus of claim 31, wherein the control unit operates the plurality of input switches and the plurality of output switches to transfer charge from the input terminal to the output terminal and, on subsequent charge/discharge cycles, reverse a voltage polarity on the charge storage device.

34. The charge transfer apparatus of claim 31, wherein the input terminal is configured to receive an AC power source and the output terminal is configured to supply an AC load.

35. The charge transfer apparatus of claim 31, wherein the control unit operates the plurality of input switches and the plurality of output switches to reconstruct and AC waveform at the output terminal.

36. The charge transfer apparatus of claim 31, wherein the input terminal is configured to receive an AC power source and the output terminal is configured to supply a DC load.

37. The charge transfer apparatus of claim 31, wherein the input terminal is configured to receive a DC power source and the output terminal is configured to supply an AC load.

38. The charge transfer apparatus of claim 31, wherein the input terminal is configured to receive a DC power source and the output terminal is configured to supply a DC load.

39. The charge transfer apparatus of claim 31, wherein the inductive element is a single-phase transformer having a primary winding coupled to the charge storage device and a secondary winding coupled to the plurality of output switches.

40. The charge transfer apparatus of claim 39, wherein the single-phase transformer is an isolation transformer.

41. The charge transfer apparatus of claim 39, wherein the single-phase transformer is an auto-transformer.

42. An electronic transformer circuit for transferring power from an input terminal having a plurality of input nodes to an output terminal having a plurality of output nodes, the electronic transformer circuit comprising:

a plurality of input switches coupled with the input node;

an inductive section coupled with the plurality of input switches;

a charge storage device coupled in series with the inductive section;

a single-phase transformer having a primary winding and a secondary winding, the primary winding coupled in parallel with the charge storage device;

a plurality of output switches, the secondary winding coupled in series with the plurality of output switches; and a control unit for operating of the plurality of input switches and the plurality of output switches, wherein the control unit alternately turns on the plurality of input switches, to transfer charge from the input terminal to the charge storage device, and turns on the plurality of output switches, to transfer charge from the charge storage device through the single-phase transformer to the output terminal.

43. The electronic transformer of claim 42 further comprising a transfer switch coupled in parallel with the charge storage device.

44. The electronic transformer of claim 42, wherein the input terminal is configured to receive a multi-phase AC power source, and the controller first turns on two of the input switches and, when a predetermined charge has been drawn from a one of the two input nodes, the controller turns on a third input switch.

45. The electronic transformer of claim 42, wherein the output terminal is configured to supply a multi-phase AC terminal, and the controller first turns on two of the output switches and, when sufficient charge has been transferred to one of that output nodes, turns on a third output switch.

46. The electronic transformer of claim 42, wherein the input terminal is configured as a DC power terminal.

47. The electronic transformer of claim 42, wherein the output terminal is configured as a DC terminal.

48. The electronic transformer of claim 42 further comprising a free-wheeling switch coupled across the charge storage device, and the control unit controls the residual voltage on the charge storage device during the charge transfer from the charge storage device to the output terminal.

49. The electronic transformer of claim 42, wherein the single-phase transformer is an isolation transformer.

50. The electronic transformer of claim 42, wherein the single-phase transformer is an auto-transformer.

51. The electronic transformer of claim 42, wherein the single-phase transformer is a step-up transformer.

52. The electronic transformer of claim 42, wherein the single-phase transformer is a step-down transformer.

* * * * *